(12) United States Patent
Won et al.

(10) Patent No.: US 10,437,090 B2
(45) Date of Patent: *Oct. 8, 2019

(54) DISPLAY DEVICE

(71) Applicant: LG ELECTRONICS INC., Seoul (KR)

(72) Inventors: Hyojin Won, Seoul (KR); Yongho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,046

(22) Filed: Oct. 16, 2018

(65) Prior Publication Data

US 2019/0094603 A1    Mar. 28, 2019

Related U.S. Application Data

(62) Division of application No. 15/392,952, filed on Dec. 28, 2016, now abandoned.

(30) Foreign Application Priority Data

Jan. 5, 2016 (KR) .................. 10-2016-0001177

(51) Int. Cl.
*G02F 1/1333* (2006.01)
*G02F 1/1335* (2006.01)
(Continued)

(52) U.S. Cl.
CPC ...... *G02F 1/133308* (2013.01); *G02F 1/1339* (2013.01); *G02F 1/1368* (2013.01);
(Continued)

(58) Field of Classification Search
CPC ............ G02F 1/1335; G02F 1/133504; G02F 1/133553; G02F 1/133308;
(Continued)

(56) References Cited

U.S. PATENT DOCUMENTS 9,690,129 B1   6/2017  Won et al.
9,804,430 B2  10/2017  Won et al.
(Continued)

FOREIGN PATENT DOCUMENTS

JP   H09160015    6/1997
JP   2013235185   11/2013
(Continued)

OTHER PUBLICATIONS

PCT International Application No. PCT/KR2016/015260, International Search Report dated Apr. 3, 2017, 3 pages.
(Continued)

*Primary Examiner* — Thoi V Duong
(74) *Attorney, Agent, or Firm* — Lee, Hong, Degerman, Kang & Waimey PC

(57) ABSTRACT

A display device is disclosed. The display device includes a first substrate, a frame positioned in the rear of the first substrate, a second substrate opposite the first substrate and positioned between the first substrate and the frame, the second substrate having an area less than an area of the first substrate, and a member layer electrically connected to the first substrate and extended toward the frame.

15 Claims, 32 Drawing Sheets

(51) Int. Cl.
  *G02F 1/1339* (2006.01)
  *G02F 1/1362* (2006.01)
  *G09F 9/35* (2006.01)
  *G02F 1/1345* (2006.01)
  *G02F 1/1368* (2006.01)

(52) U.S. Cl.
  CPC .... *G02F 1/13452* (2013.01); *G02F 1/133512* (2013.01); *G02F 1/133514* (2013.01); *G02F 1/133608* (2013.01); *G02F 1/136209* (2013.01); *G09F 9/35* (2013.01); *G02F 2001/13332* (2013.01); *G02F 2001/13685* (2013.01); *G02F 2001/133314* (2013.01); *G02F 2001/133322* (2013.01); *G02F 2001/133325* (2013.01)

(58) Field of Classification Search
  CPC ............. G02F 1/133608; G02F 1/1336; G02F 1/1339; G02F 1/1333; G02F 1/133602; G02F 1/133605; G02F 2001/133317; G02F 2001/133314; G02F 2001/13332; G02F 2001/133322; G02F 2001/133325; G02F 2001/133311; G02F 2001/133328; G02F 2001/133331; G02F 2001/133388; G02F 2201/465; G02F 2201/46; G02F 2202/28; G02F 1/1368; G02F 1/13452; G02F 1/133514; G02F 1/136209; G02F 1/133512; G02F 2001/13685; G02F 2001/13314; G02B 6/0051; G02B 6/0055; G02B 6/0023; G02B 6/0025; G02B 6/0035; G02B 6/0043; G02B 6/0053; G09F 15/0012; G09F 7/10; G09F 1/12; G09F 2007/1843; G09F 9/35; H05K 5/0217; H05K 5/03; H05K 2201/10136
  See application file for complete search history.

(56) References Cited

U.S. PATENT DOCUMENTS

| | | |
|---|---|---|
| 2008/0117367 A1 | 5/2008 | Abe |
| 2008/0298000 A1 | 12/2008 | Choi |
| 2010/0134710 A1 | 6/2010 | Ishitani et al. |
| 2011/0164197 A1 | 7/2011 | Oohira |
| 2011/0310545 A1 | 12/2011 | Liu |
| 2012/0092585 A1 | 4/2012 | Byeon et al. |
| 2012/0106122 A1 | 5/2012 | Ryu et al. |
| 2013/0236680 A1 | 9/2013 | Ahn et al. |
| 2015/0002936 A1 | 1/2015 | Jun et al. |
| 2015/0253613 A1 | 9/2015 | Yoon et al. |
| 2015/0351261 A1 | 12/2015 | Lee et al. |
| 2016/0349568 A1 | 12/2016 | Oh |
| 2017/0192289 A1 | 7/2017 | Won et al. |

FOREIGN PATENT DOCUMENTS

| | | |
|---|---|---|
| JP | 2013254142 | 12/2013 |
| JP | 2015191078 | 11/2015 |
| KR | 1020150058669 | 5/2015 |

OTHER PUBLICATIONS

European Patent Office Application Serial No. 17150022.6, Search Report dated May 15, 2017, 7 pages.
European Patent Office Application Serial No. 18150471.3, Search Report dated May 8, 2018, 19 pages.

DISPLAY DEVICE

This application is a divisional of U.S. patent application Ser. No. 15/392,952, filed on Dec. 28, 2016, now abandoned, which claims the benefit of earlier filing date and right of priority to Korean Patent Application No. 10-2016-0001177, filed on Jan. 5, 2016, the contents of which are all hereby incorporated by reference herein in its entirety.

BACKGROUND OF THE INVENTION

Field of the Invention

The present disclosure relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

Accordingly, an object of the present disclosure is to provide a display device including a display panel exposed to the outside.

Another aspect of the present disclosure is to provide a display device having a thin profile and a rigidity structure.

In one aspect, there is provided a display device comprising a first substrate, a frame positioned in the rear of the first substrate, a second substrate opposite the first substrate and positioned between the first substrate and the frame, the second substrate having an area less than an area of the first substrate, and a member layer electrically connected to the first substrate and extended toward the frame.

According to another aspect of the present disclosure, the first substrate may include a thin film transistor (TFT), and the second substrate may include a color filter.

According to another aspect of the present disclosure, the TFT may be formed between the first substrate and the second substrate.

According to another aspect of the present disclosure, the display device may further comprise an electrode line electrically connected to the TFT. The electrode line may be exposed to the outside by a difference between the area of the first substrate and the area of the second substrate.

According to another aspect of the present disclosure, the member layer may be electrically connected to the electrode line exposed to the outside.

According to another aspect of the present disclosure, the display device may further comprise a cover layer between the first substrate and the TFT.

According to another aspect of the present disclosure, the cover layer may include a material with black.

According to another aspect of the present disclosure, the display device may further comprise a liquid crystal layer filled between the first substrate and the second substrate.

According to another aspect of the present disclosure, a side of at least one of the first substrate and the second substrate may be exposed to the outside.

According to another aspect of the present disclosure, the display device may further comprise a sealing member covering a side of at least one of the first substrate and the second substrate.

According to another aspect of the present disclosure, the sealing member may not cover one side of the second substrate.

According to another aspect of the present disclosure, the sealing member may cover all of sides of the first substrate. The sealing member may cover sides of the second substrate, on which the member layer is not positioned.

According to another aspect of the present disclosure, the sealing member may be adhered to the side of at least one of the first substrate and the second substrate.

According to another aspect of the present disclosure, the sealing member may not cover a lower surface of the second substrate.

According to another aspect of the present disclosure, the member layer may be extended from a lower side of the first substrate or the second substrate toward the frame.

In one aspect, there is provided a display device comprising a flat main frame, a side frame positioned on one side of the main frame, and a display panel covering at least a portion of a front surface of the side frame, a side of the display panel being exposed to the outside.

According to another aspect of the present disclosure, the side frame may include an outer frame forming an outer perimeter of the side frame and an inner frame positioned inside the outer frame, a height difference being generated between the inner frame and the outer frame.

According to another aspect of the present disclosure, the height difference may be generated at a back surface of the side frame.

According to another aspect of the present disclosure, the main frame may be inserted into the back surface of the side frame due to the height difference and may be coupled with the side frame.

According to another aspect of the present disclosure, the main frame may be bonded to the side frame.

According to another aspect of the present disclosure, the outer frame may include a guide protrusion protruding along an extension direction of the outer frame toward the inside of the side frame. The main frame may include a guide groove extending along the side of the main frame and may be slidingly coupled with the side frame.

According to another aspect of the present disclosure, the outer frame may include a coupling protrusion protruding from a back surface of the outer frame to the inside of the side frame and extending along a longitudinal direction of the outer frame. The main frame may slide on the side frame and may be fixed to the side frame through the coupling protrusion.

According to another aspect of the present disclosure, the display device may further comprise a backlight unit between the main frame and the display panel. The inner frame may include a groove at its back surface. The backlight unit may include an optical sheet having a coupling portion which is positioned inside the inner frame and protrudes to the outside of the backlight unit. The coupling portion of the optical sheet may be inserted into the groove of the inner frame.

According to another aspect of the present disclosure, the inner frame may include a hanging portion protruding from the groove of the inner frame and inserted into the coupling portion.

According to another aspect of the present disclosure, the side frame may bend and may be positioned on at least two sides of the main frame. The side frame may further include a reinforcement member positioned at a corner of the side frame.

According to another aspect of the present disclosure, the reinforcement member may be positioned inside the corner of the side frame.

According to another aspect of the present disclosure, the display device may further comprise an adhesive member fixed to a front surface of the side frame. The display panel may be fixed to the adhesive member.

According to another aspect of the present disclosure, the side frame may include a flat portion positioned inside the front surface of the side frame and an inclined portion positioned outside the front surface of the side frame. The adhesive member may be fixed to the flat portion.

According to another aspect of the present disclosure, the main frame may have a flat rectangular shape, and the side frame may be positioned on three sides of the main frame. The display device may further comprise a bottom frame positioned on one remaining side of the main frame and coupled with the side frame.

According to another aspect of the present disclosure, the display device may further comprise a member layer which is electrically connected to the display panel, extends from one side of the display panel, and passes between the main frame and the bottom frame.

According to another aspect of the present disclosure, the display device may further comprise a controller provided in the rear of the main frame. The member layer may be electrically connected to the controller.

According to another aspect of the present disclosure, the display device may further comprise a back cover, in which one side is fixed to the main frame and the other side is fixed to the bottom frame.

According to another aspect of the present disclosure, all of upper, lower, left and right sides of the display panel may be positioned outside the side frame.

According to another aspect of the present disclosure, the display device may further comprise a sealing member bonded to the upper, lower, left and right sides of the display panel.

According to another aspect of the present disclosure, the sealing member may be separated from the front surface of the side frame.

An effect of the display device according to the present disclosure is described below.

According to at least one aspect of the present disclosure, the present disclosure can provide the display device including a display panel exposed to the outside.

According to at least one aspect of the present disclosure, the present disclosure can provide the display device having a thin profile and a rigidity structure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
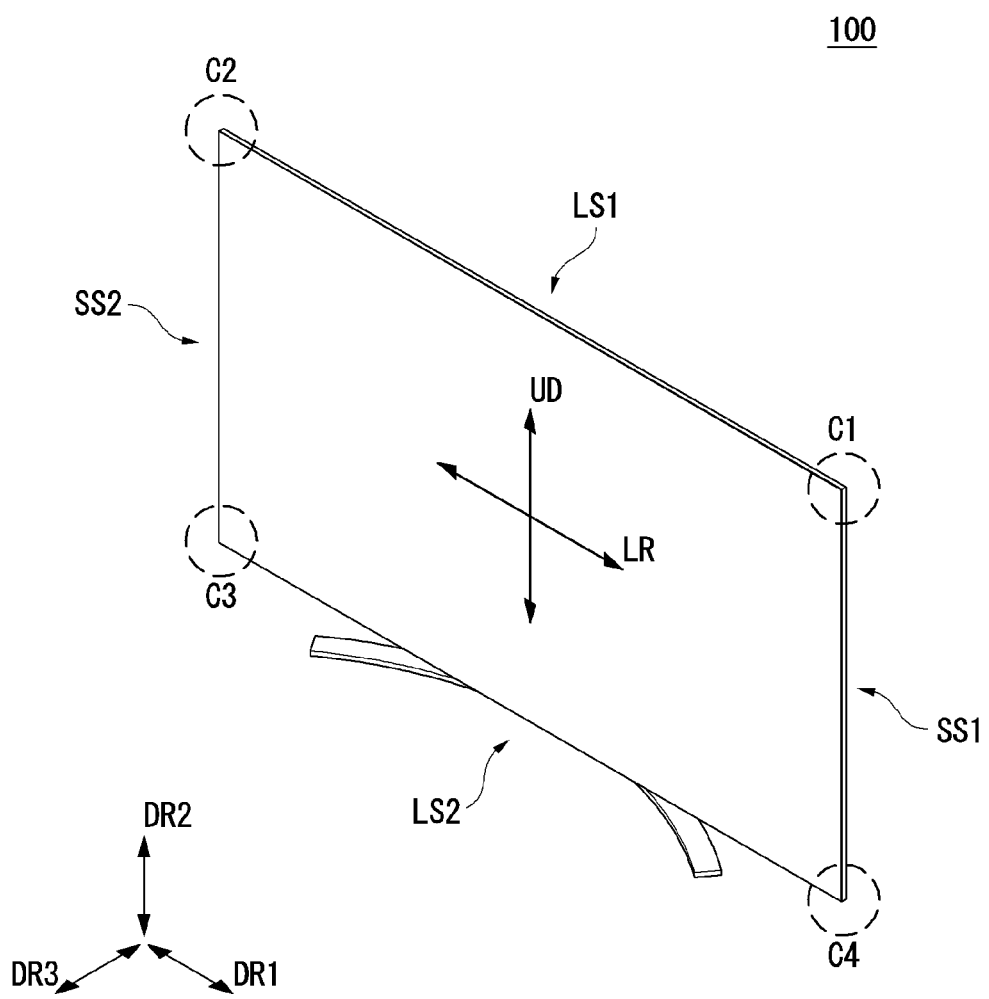
FIGS. 1, 2, 3, and 4 illustrate general configuration of a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display device 100 may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device 100, and a second direction DR2 may be a direction parallel to the short sides SS1 and SS2 of the display device 100.

Further, a third direction DR3 may be a direction perpendicular to the first direction DR1 and/or the second direction DR2.

In the embodiment disclosed herein, the first direction DR1 and the second direction DR2 may be commonly referred to as a horizontal direction. Further, the third direction DR3 may be referred to as a vertical direction.

In another point of view, a side or a surface, on which the display device 100 displays an image, may be referred to as a front side or a front surface. When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

FIGS. 1 to 4 illustrate general configuration of a display device according to an example embodiment of the invention.

Figure 2:
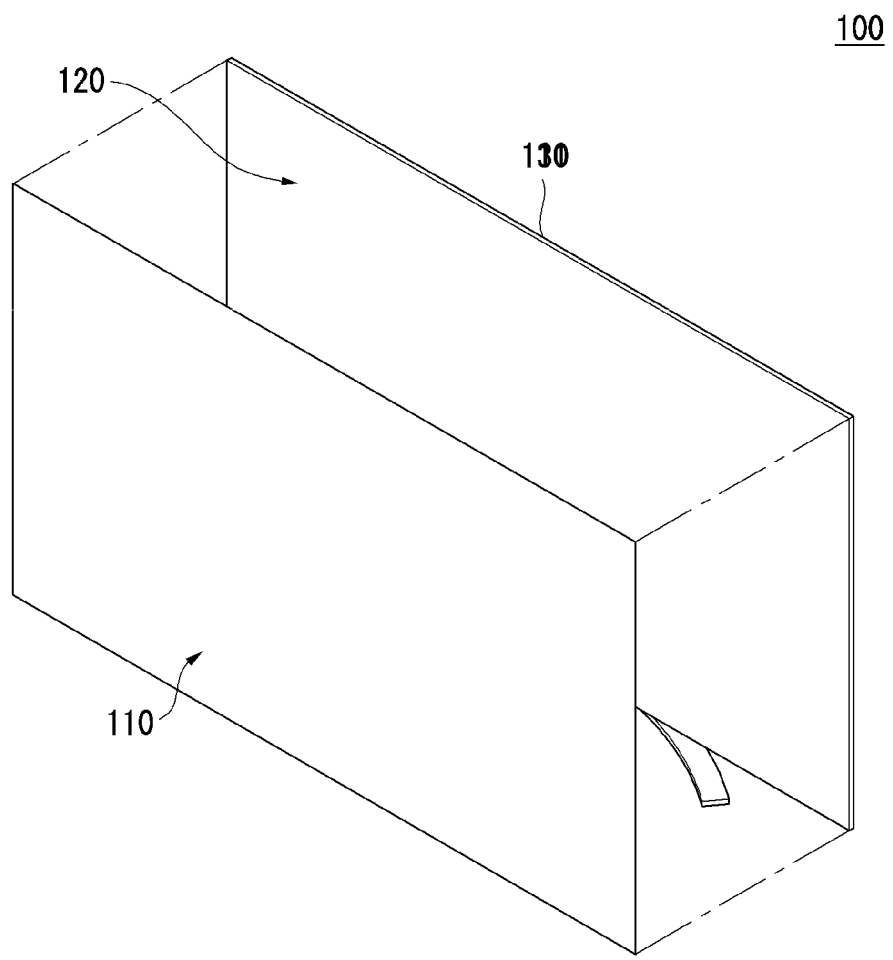

Referring to FIGS. 1 and 2, a display panel 110 may be provided at a front surface of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a first substrate and a second substrate which are positioned opposite each other with a liquid crystal layer interposed therebetween. For example, the display panel 110 may include a front substrate and a back substrate.

A backlight unit 120 may be positioned in the rear of the display panel 110. The backlight unit 120 may include a plurality of light sources. The light sources of the backlight unit 120 may be arranged in an edge type or a direct type. In the instance of the edge type backlight unit 120, a light guide plate may be added.

The backlight unit 120 may be driven in an entire driving method or a partial driving method, such as a local dimming method and an impulsive driving method. The backlight unit 120 may include an optical sheet or an optical layer.

Figure 3:
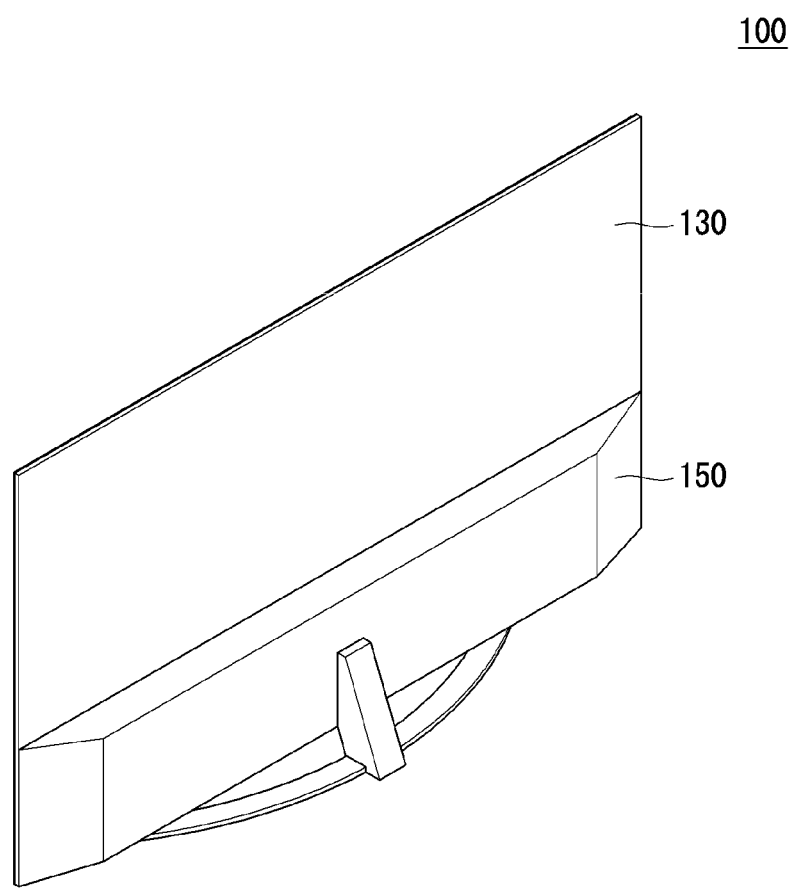
Figure 4:
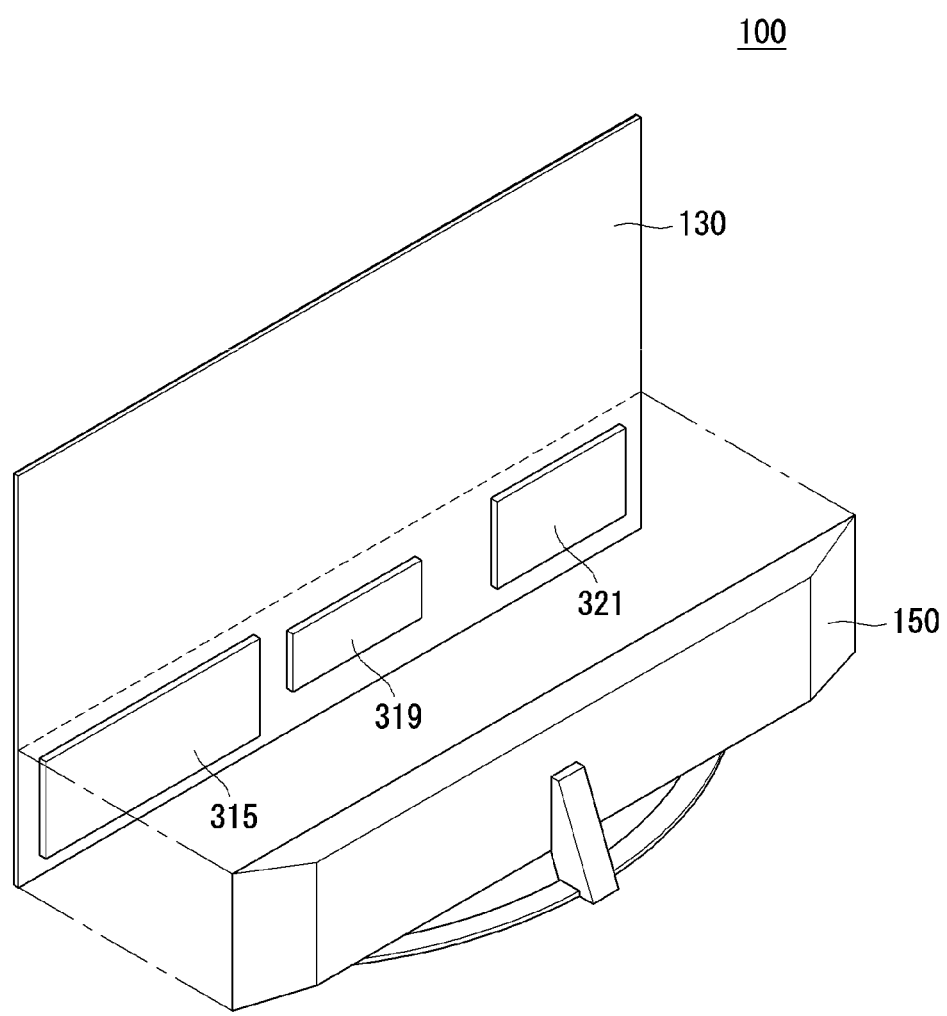

Referring to FIGS. 3 and 4, a frame 130 may function to support components of the display device 100. For example, the frame 130 may be coupled to the backlight unit 120. The frame 130 may be formed of a metal material, for example, an aluminum alloy. The frame 130 may be referred to as a main frame.

A back cover 150 may be positioned at a back surface of the display device 100. The back cover 150 may protect inner configuration of the display device 100 from the outside. At least a portion of the back cover 150 may be coupled to the frame 130. For example, the back cover 150 may be an injection production (or injection molded) formed of a resin material.

A power supply board 315 may be a printed circuit board (PCB) supplying electric power to the display device 100. The power supply board 315 may convert AC electric power into DC electric power.

A main board 321 may be a printed circuit board providing an interface for operating the display device 100. Further, the main board 321 may check and control an operation state of each component of the display device 100.

A timing controller board 319 may be a printed circuit board transmitting electric power or signals received from the power supply board 315 or the main board 321 to the display panel 110. The timing controller board 319 may be electrically connected to the display panel 110 positioned at a front surface of the frame 130 through flat flexible cables.

The power supply board 315, the main board 321, and/or the timing controller board 319 may be commonly referred to as a controller.

Figure 5:
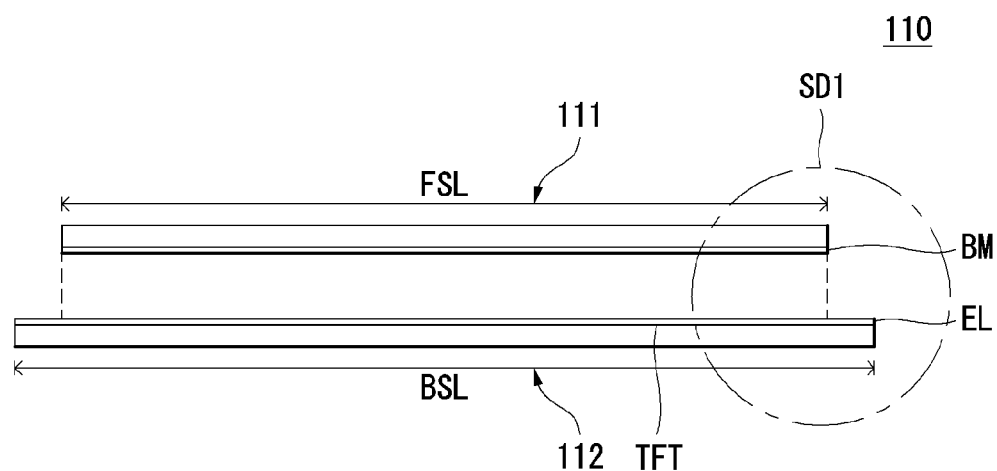
FIGS. 5, 6, and 7 illustrate examples of a display panel related to an example embodiment of the invention.
Figure 6:
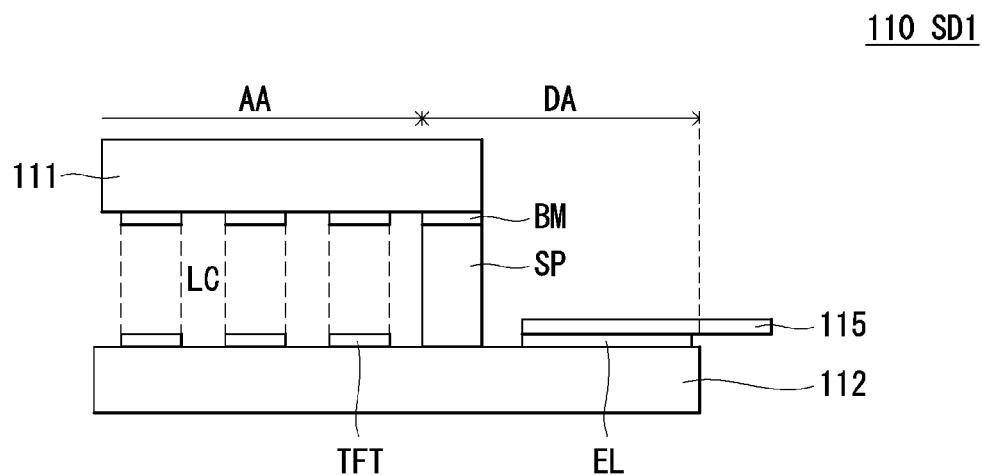
Figure 7:
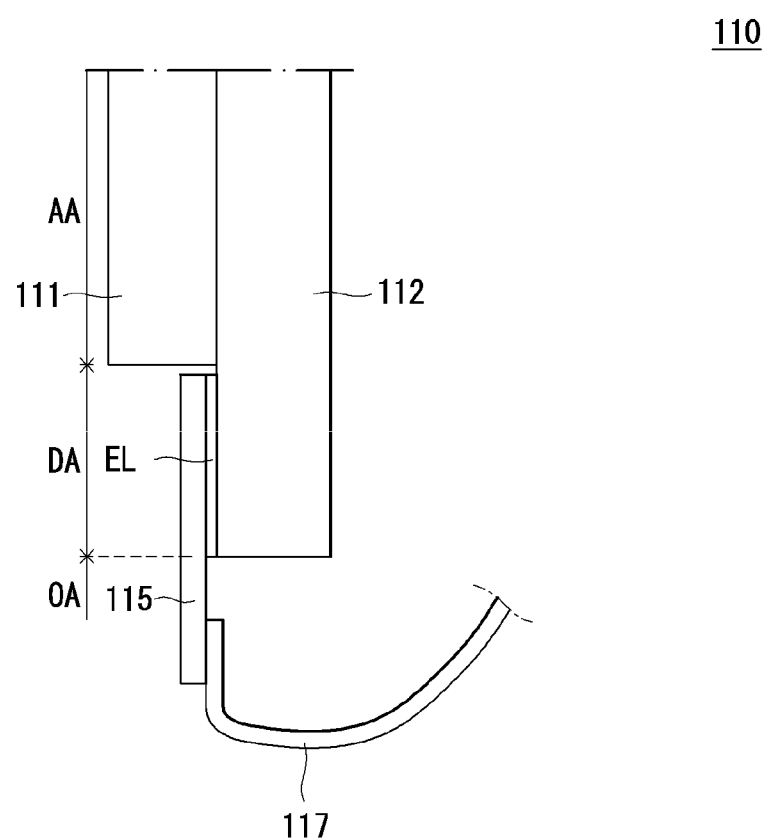

FIGS. 5 to 7 illustrate examples of a display panel according to an example embodiment of the invention.

Referring to FIG. 5, the display panel 110 may include a first substrate 111 and a second substrate 112. The first substrate 111 may be exposed to the outside while forming the front surface of the display device 100. The second substrate 112 may be positioned opposite the first substrate 111. Liquid crystals may be filled between the first substrate 111 and the second substrate 112. Namely, a liquid crystal layer may be formed between the first substrate 111 and the second substrate 112. The first substrate 111 may be a front substrate, and the second substrate 112 may be a back substrate.

A length FSL of the front substrate 111 may be shorter than a length BSL of the back substrate 112. The length BSL of the back substrate 112 may be longer than the length FSL of the front substrate 111. Namely, the length FSL of the front substrate 111 may be different from the length BSL of the back substrate 112. The front substrate 111 may have a color filter. The back substrate 112 may have a thin film transistor (TFT). The TFT may include a black material.

The length BSL of the back substrate 112 may be longer than the length FSL of the front substrate 111, so that TFT lines are connected to the outside of the display panel 110. Namely, an electrode line EL electrically connected to the TFT included in the back substrate 112 may be externally exposed due to a difference between the lengths of the front substrate 111 and the back substrate 112. The front substrate 111 may include a cover layer BM corresponding to the TFT line. For example, the cover layer BM may be black. Hence, the cover layer BM may prevent the TFT line from being reflected on the outside of the display panel 110.

Referring to FIG. 6 which is an enlarged view of a portion SD1 of FIG. 5, a liquid crystal layer LC may be formed between the front substrate 111 and the back substrate 112. Further, a spacer SP may be positioned between the front substrate 111 and the back substrate 112. The spacer SP may uniformly maintain a distance between the front substrate 111 and the back substrate 112. Namely, the spacer SP may uniformly maintain a thickness of the liquid crystal layer LC filled in the display panel 110. Hence, the spacer SP may improve structural stability of the display panel 110.

The back substrate 112 may include the TFT. The plurality of TFTs may be formed on the back substrate 112. The TFTs may be arranged on the back substrate 112 in a matrix form. The TFTs may be formed on a portion or the entire surface of the back substrate 112. The electrode line EL may be electrically connected to the TFT. The electrode line EL may be externally exposed from the display panel 110 due to a difference between the lengths of the front substrate 111 and the back substrate 112.

The front substrate 111 may include the cover layer BM. The cover layer BM may be positioned opposite the TFT. In another point of view, the cover layer BM may overlap the TFT. Namely, the cover layer BM may cover the TFT when viewed from a front surface of the display panel 110. For example, the cover layer BM may be black.

The display panel 110 may include an active area AA and an inactive area DA. The active area AA may be an area, on which an image is displayed, and the inactive area DA may be an area, on which the image is not displayed. An electrode 115 may be electrically connected to the electrode line EL. The electrode 115 may be positioned in the inactive area DA. The electrode 115 may be bonded to the electrode line EL, which is exposed to the outside of the display panel 110 due to a difference between the lengths of the front substrate 111 and the back substrate 112, and may be electrically connected to the TFT. The electrode 115 may be a pad electrode.

Referring to FIG. 7, a member layer 117 may be electrically connected to the electrode 115. For example, the member layer 117 may be a chip-on-film (COF), a chip-on-glass (COG), a flexible printed circuit board (FPCB), a tape carrier package (TCP), and the like. Namely, the electrode line EL may be electrically connected to the TFT, the electrode 115 may be electrically connected to the electrode line EL, and the member layer 117 may be bonded to the electrode 115 and electrically connected to the electrode 115. The member layer 117 may bend toward the rear of the back substrate 112. The member layer 117 may be extended toward the main board 321, the timing controller board 319, or the power supply board 315 which are positioned in the rear of the back substrate 112. The member layer 117 may be extended to an outer area OA because the length of the back substrate 112 is longer than the length of the front substrate 111. Namely, a configuration or a length of the display panel 110 may include a sum of a length of the active area AA, a length of the inactive area DA, and a length of the electrode 115 or the member layer 117 positioned in the outer area OA.

Figure 8:
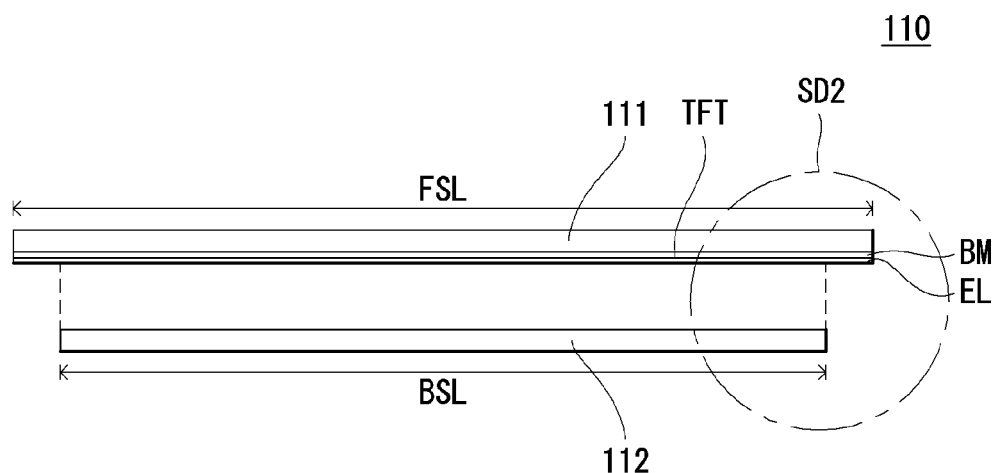
FIGS. 8, 9, 10A, 10B, 10C, and 10D illustrate another example of a display panel according to an example embodiment of the invention.
Figure 9:
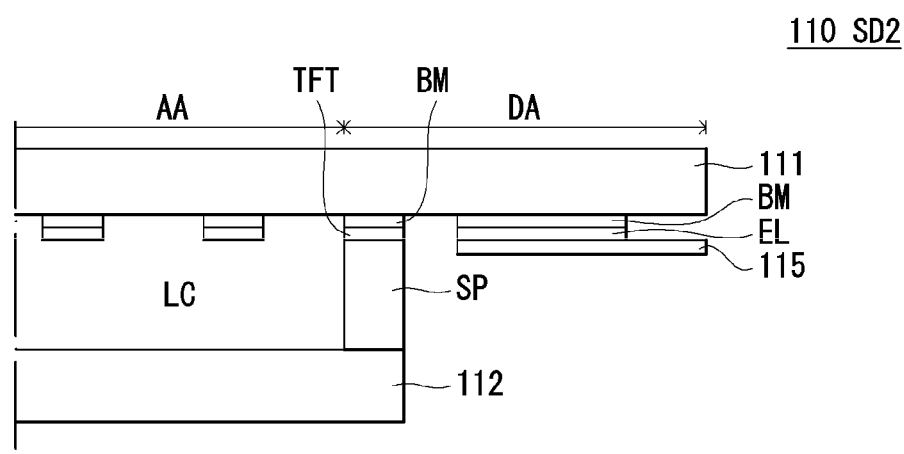

FIGS. 8 to 10 illustrate another example of a display panel according to an example embodiment of the invention.

Referring to FIG. 8, the display panel 110 may include a first substrate 111 and a second substrate 112. The first substrate 111 may be exposed to the outside while forming the front surface of the display device 100. The second substrate 112 may be positioned opposite the first substrate 111. Liquid crystals may be filled between the first substrate 111 and the second substrate 112. Namely, a liquid crystal layer may be formed between the first substrate 111 and the second substrate 112. The first substrate 111 may be a front substrate, and the second substrate 112 may be a back substrate.

A length FSL of the front substrate 111 may be longer than a length BSL of the back substrate 112. The length BSL of the back substrate 112 may be shorter than the length FSL of the front substrate 111. Namely, the length FSL of the front substrate 111 may be different from the length BSL of the back substrate 112. The front substrate 111 may have a TFT. The back substrate 112 may have a color filter.

The length FSL of the front substrate 111 may be longer than the length BSL of the back substrate 112, so that an electrical line of the TFT is connected to the outside of the display panel 110. Namely, an electrode line EL electrically connected to the TFT included in the front substrate 111 may be exposed to the outside due to a difference between the lengths of the front substrate 111 and the back substrate 112. The front substrate 111 may include a cover layer BM corresponding to the TFT line. For example, the cover layer BM may be black. Hence, the cover layer BM may prevent the TFT line from being reflected on the outside of the display panel 110.

Referring to FIG. 9 which is an enlarged view of a portion SD2 of FIG. 8, a liquid crystal layer LC may be formed between the front substrate 111 and the back substrate 112. Further, a spacer SP may be positioned between the front substrate 111 and the back substrate 112. The spacer SP may uniformly maintain a distance between the front substrate 111 and the back substrate 112. Namely, the spacer SP may uniformly maintain a thickness of the liquid crystal layer LC filled in the display panel 110. Hence, the spacer SP may improve structural stability of the display panel 110.

The front substrate 111 may include the TFT. The plurality of TFTs may be formed on the front substrate 111. The TFTs may be arranged on the front substrate 111 in a matrix form. The TFTs may be formed on a portion or the entire surface of the front substrate 111. The electrode line EL may be electrically connected to the TFT. The electrode line EL may be exposed to the outside of the display panel 110 due to a difference between the lengths of the front substrate 111 and the back substrate 112.

The front substrate 111 may include switching elements. The switching elements may be the TFTs. The switching element may switch on or off a pixel electrode. For example, the pixel electrode may change an arrangement of molecules of the liquid crystal layer LC in response to a control signal received from the outside. The liquid crystal layer LC may include a plurality of liquid crystal molecules. The arrangement of the liquid crystal molecules may change depending on a voltage difference between the pixel electrode and a common electrode. The liquid crystal layer LC may transfer light provided by the backlight unit 120 to the front substrate 111.

The front substrate 111 may include the cover layer BM. The cover layer BM may be positioned between the TFT and the front substrate 111. The cover layer BM may contact the TFT. The cover layer BM may be formed on a back surface of the front substrate 111, and the TFT may be formed on the cover layer BM. In another point of view, the cover layer BM may overlap the TFT. Namely, the cover layer BM may cover the TFT when viewed from a front surface of the display panel 110. For example, the cover layer BM may be black.

The display panel 110 may include an active area AA and an inactive area DA. The active area AA may be an area, on which an image is displayed, and the inactive area DA may be an area, on which the image is not displayed. An electrode 115 may be electrically connected to the electrode line EL. The electrode 115 may be positioned in the inactive area DA. The electrode 115 may be bonded to the electrode line EL, which is exposed to the outside of the display panel 110 due to a difference between the lengths of the front substrate 111 and the back substrate 112, and may be electrically connected to the TFT. The electrode 115 may be a pad electrode.

Figure 10A:
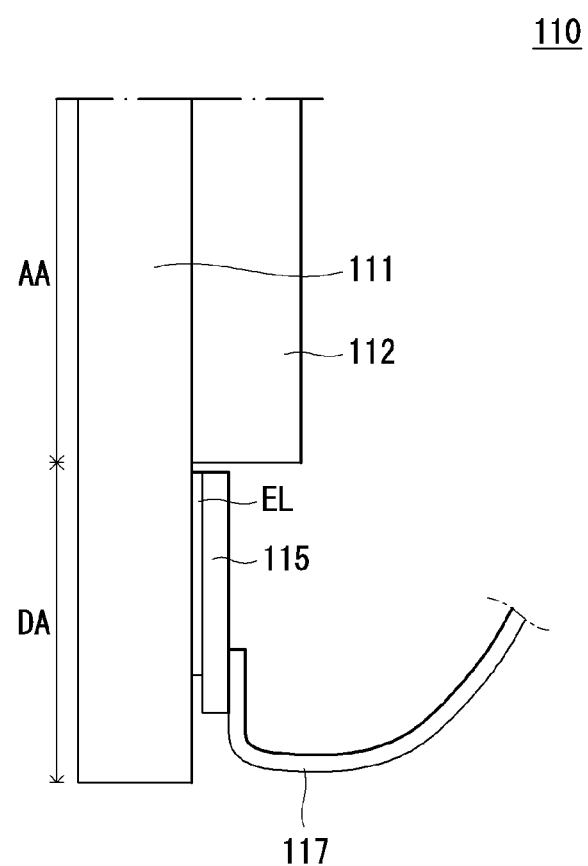

Referring to FIG. 10A, a member layer 117 may be electrically connected to the electrode 115. Namely, the electrode 115 may be electrically connected to the electrode line EL, and the member layer 117 may be bonded to the electrode 115 and electrically connected to the electrode 115. The member layer 117 may bend toward the rear of the back substrate 112. The member layer 117 may be extended toward the main board 321, the timing controller board 319, or the power supply board 315, which are positioned in the rear of the back substrate 112. The member layer 117 may be extended on the inactive area DA because the length of the front substrate 111 is longer than the length of the back substrate 112. Namely, a configuration or a length of the display panel 110 may include a sum of a length of the active area AA and a length of the inactive area DA. Namely, the electrode 115 and the member layer 117 may be connected to each other within a range less than the length of the display panel 110 described with reference to FIGS. 5 to 7. This may lead to a reduction in a bezel.

The member layer 117 may be connected to one side surface, one side, or one edge of the display panel 110, so that a source PCB is connected to the TFT line. The connection between the member layer 117 and the display panel 110 may require the bezel to be formed on one side of the display panel 110. The configuration of the display panel 110 described with reference to FIGS. 8 to 10 is such that the source PCB may be connected to the TFT line, and the bezel formed by the connection may be removed or may minimize its size.

Figure 10B:
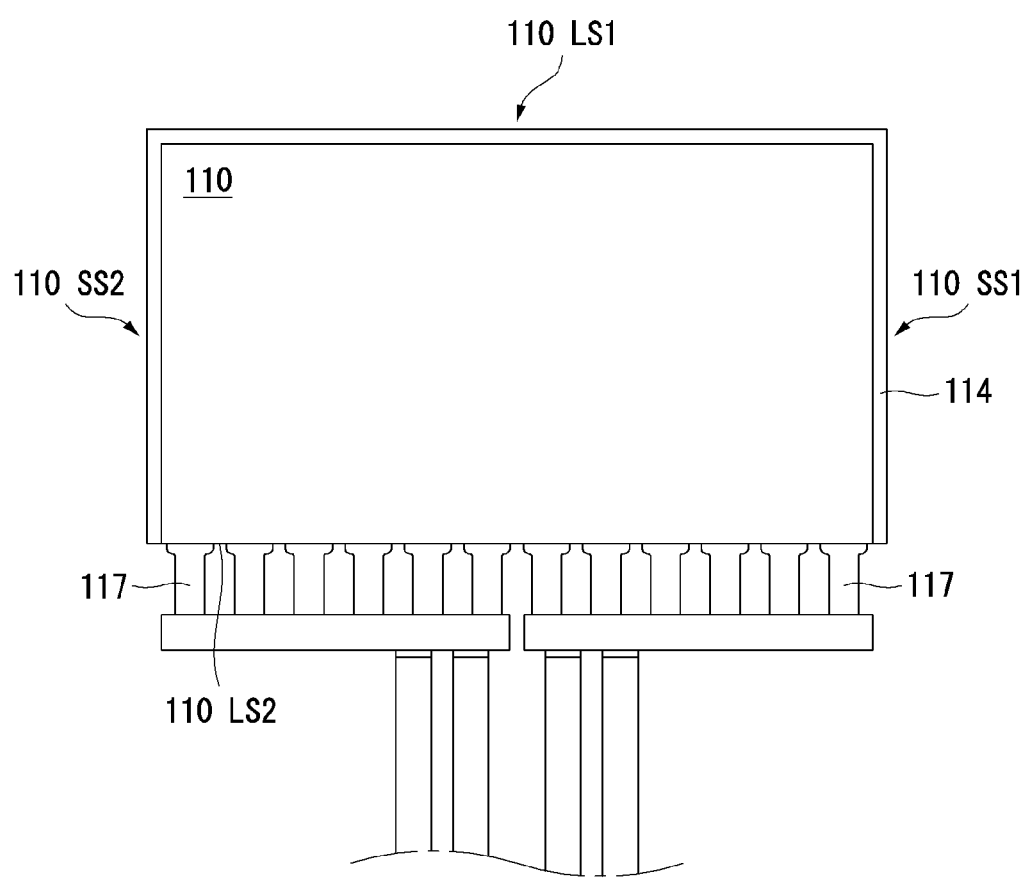

Referring to FIG. 10B, a panel cover 114 may cover the side of the display panel 110. The panel cover 114 may be referred to as a sealing member. The sealing member 114 may be attached to the side of the display panel 110. The sealing member 114 may seal the side of the display panel 110. In this instance, the sealing member 114 may cover a first long side 110LS1, a first short side 110SS1, and a second short side 110SS2 of the display panel 110. Hence, the sealing member 114 may prevent the side of the display panel 110 from being polluted or damaged.

Figure 10C:
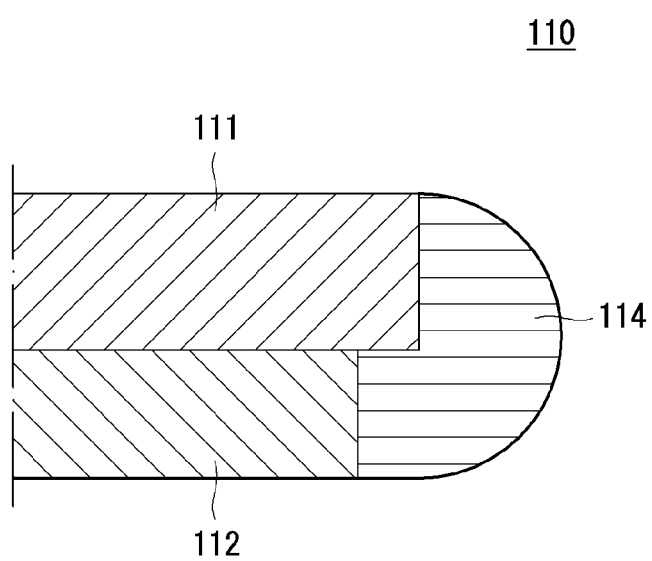

Referring to FIG. 10C, the sealing member 114 may be positioned on a side of the display panel 110. The display panel 110 may include the first substrate 111 and the second substrate 112. The first substrate 111 may be the front substrate, and the second substrate 112 may be the back substrate. The sealing member 114 may cover a side of the front substrate 111 and a side of the back substrate 112. The sealing member 114 may be attached to the side of the front substrate 111 and the side of the back substrate 112. In FIG. 10C, the side of the display panel 110 may be the first long side 110LS1, the first short side 110SS1, and/or the second short side 110SS2 shown in FIG. 10A. Namely, the side of the display panel 110 may be a side, which is not connected to the member layer 117.

Figure 10D:
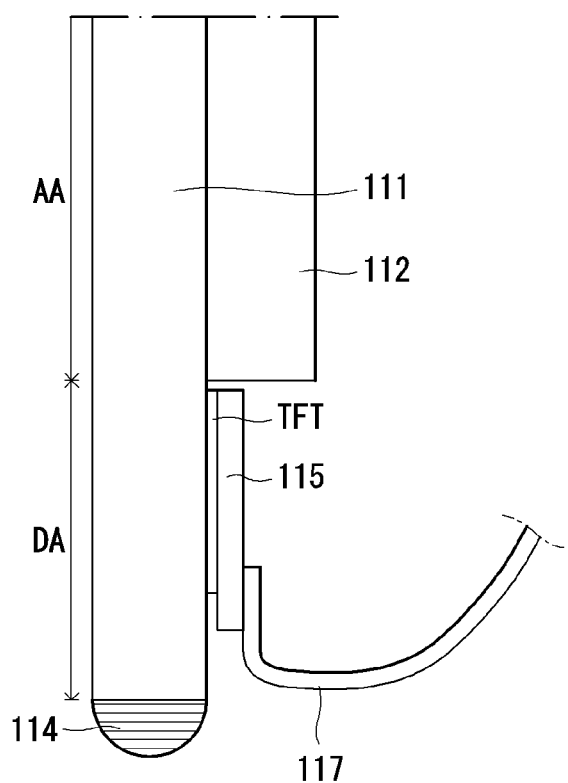

Referring to FIG. 10D, the sealing member 114 may be positioned on a side of the display panel 110. The display panel 110 may include the first substrate 111 and the second substrate 112. The first substrate 111 may be the front substrate, and the second substrate 112 may be the back substrate. The sealing member 114 may cover a side of the front substrate 111. The sealing member 114 may be attached to the side of the front substrate 111. In FIG. 10D, the side of the display panel 110 may be a second long side 110LS2 shown in FIG. 10A. Namely, the side of the display panel 110 may be a side, which is connected to the member layer 117.

Figure 11:
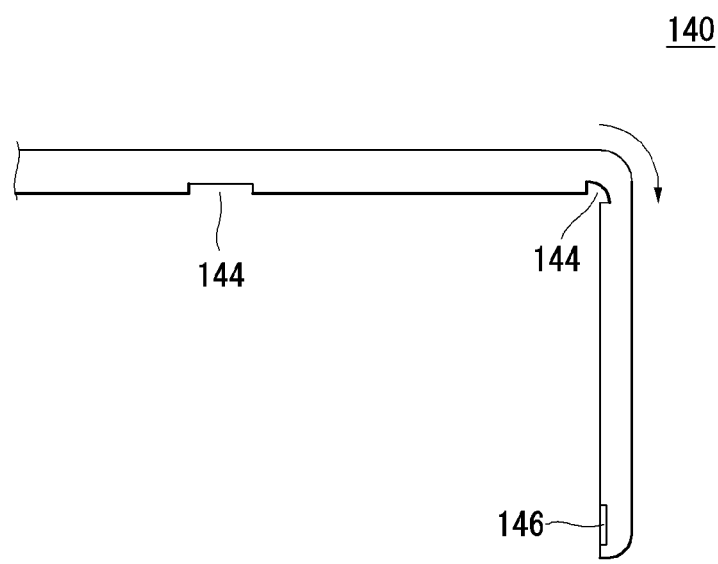
FIGS. 11, 12, 13, and 14 illustrate examples of a side frame according to an example embodiment of the invention.
Figure 12:
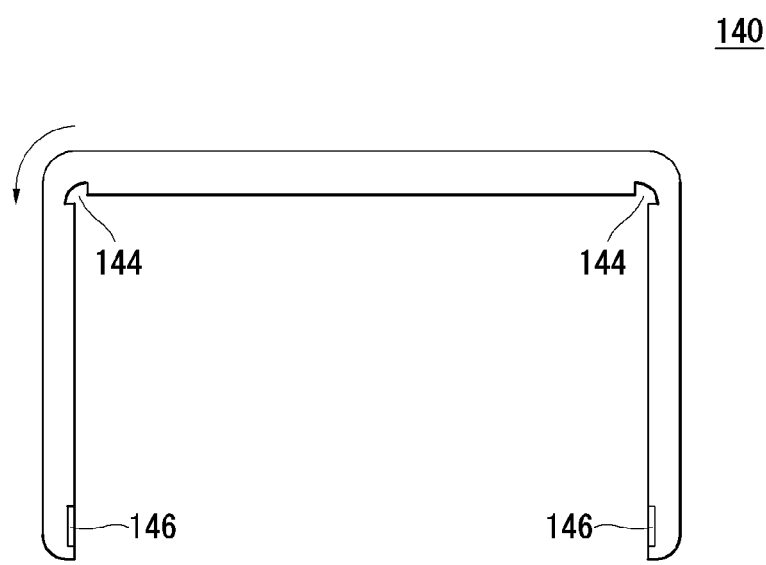
Figure 13:
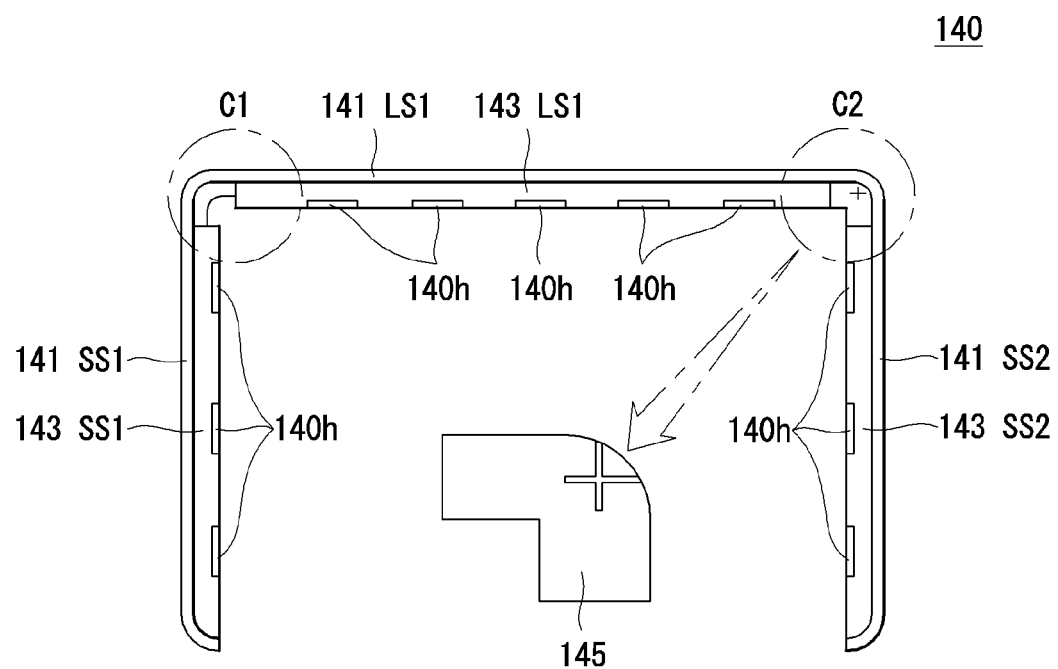
Figure 14:
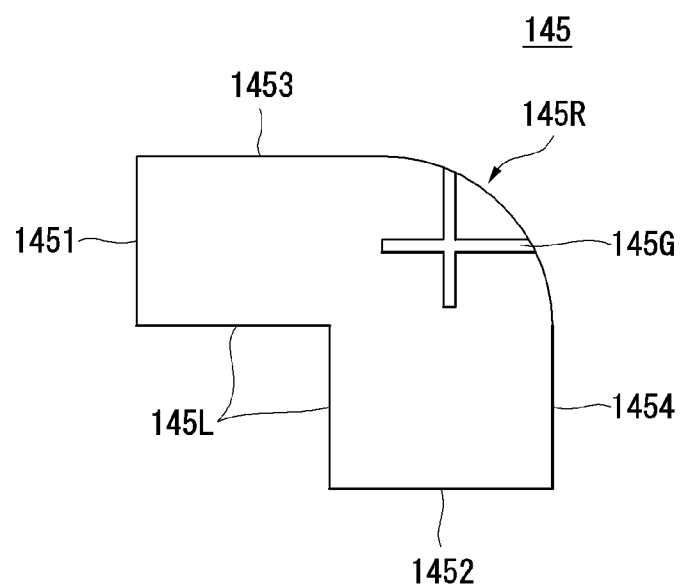

FIGS. 11 to 14 illustrate examples of a side frame according to an example embodiment of the invention. More specifically, FIGS. 11 and 12 illustrate examples of a front surface of a side frame according to an example embodiment of the invention, FIG. 13 illustrates an example of a back surface of a side frame according to an example embodiment of the invention, and FIG. 14 illustrates an example of a reinforcement member according to an example embodiment of the invention.

Referring to FIGS. 11 and 12, a side frame 140 may extend. The side frame 140 may have a symmetrical or asymmetrical cross section. The side frame 140 may include a metal material. The side frame 140 may have a groove 144. The groove 144 may be formed on one side of the side frame 140.

The groove 144 may be a plurality of grooves. The plurality of grooves 144 may be sequentially formed on one side of the side frame 140. The plurality of grooves 144 may be separated from one another on one side of the side frame 140 by a predetermined distance. Each groove 144 may extend to the inside of the side frame 140.

The side frame 140 may bend at a formation location of the groove 144. The side frame 140 may be formed in a ]-shape or a [-shape through the bending. The side frame 140 may entirely have a ⊏-shape. A groove 146 may be formed at one end or both ends of the side frame 140. The groove 146 may be formed on a front surface of the side frame 140.

The side frame 140 may be formed through the bending, or may be formed by coupling separate frames.

Referring to FIG. 13, the side frame 140 may include an outer frame 141 and an inner frame 143. The outer frame 141 may form an outer perimeter of the side frame 140. The outer frame 141 may form the first long side LS1, the first short side SS1, and the second short side SS2 of the display device 100. The outer frame 141 may be formed as one body, or may be formed by coupling separate frames.

The inner frame 143 may be connected to the outer frame 141. The inner frame 143 may extend from the outer frame 141. The inner frame 143 may be a plurality of inner frames. The inner frame 143 may be formed as one body along with the outer frame 141, or may be formed separately from the outer frame 141 and then may be coupled with the outer frame 141. The inner frame 143 may include a first inner frame 143LS1, a second inner frame 143SS1, and a third inner frame 143SS2. The inner frame 143 may be formed at a height difference from the outer frame 141. For example, the inner frame 143 and the outer frame 141 may form a step. The height difference may decrease as it goes from the outer frame 141 to the inner frame 143. In other words, the inner frame 143 may be formed so as to be stepped from the outer frame 141. The inner frame 143 can form a step that is lowered from the outer frame 141

The first inner frame 143LS1 may extend from an outer frame 141LS1 of the first long side LS1 to the inside of the side frame 140. In this instance, the first inner frame 143LS1 may be a flat extended plate. The second inner frame 143SS1 may extend from an outer frame 141SS1 of the first short side SS1 to the inside of the side frame 140. In this instance, the second inner frame 143SS1 may be a flat extended plate. The third inner frame 143SS2 may extend from an outer frame 141SS2 of the second short side SS2 to the inside of the side frame 140. In this instance, the third inner frame 143SS2 may be a flat extended plate. The outer frame 141 may entirely form an outer shape of the side frame 140. The inner frame 143 may be connected to the outer frame 141 and may provide a support force for the components of the display device 100.

A reinforcement member 145 may be positioned at a first corner C1 and/or a second corner C2. The reinforcement member 145 may be positioned adjacent to the first corner C1 inside the outer frame 141. The reinforcement member 145 may be positioned between the outer frame 141, the second inner frame 143SS1 of the first short side SS1, and the first inner frame 143LS1 of the first long side LS1. The reinforcement member 145 may contact the outer frame 141, the second inner frame 143SS1, or the first inner frame 143LS1. The reinforcement member 145 may provide rigidity for the side frame 140, so that the bending of the side frame 140 is maintained. Since the configuration of the reinforcement member 145 adjacent to the first corner C1 may be equally applied to a reinforcement member 145, which may be positioned adjacent to the second corner C2, a further description may be briefly made or may be entirely omitted.

The inner frame 143 may have a groove 140h. The groove 140h may be a plurality of grooves 140h. For example, the inner frame 143LS1 of the first long side LS1 may have five grooves 140h. The five grooves 140h may be sequentially formed on the inner frame 143LS1 of the first long side LS1. The five grooves 140h may be positioned at regular intervals or at irregular intervals. In another embodiment, the inner frame 143SS1 or 143SS2 of the first or second short side may have three grooves 140h. The three grooves 140h may be sequentially formed on the inner frame 143SS1 of the first short side SS1 at regular intervals.

Referring to FIG. 14, the reinforcement member 145 may include a straight portion 145L and a round portion 145R. The straight portion 145L may form an inside of the reinforcement member 145. The straight portion 145L may improve the support rigidity of the reinforcement member 145. The round portion 145R may form an outside of the reinforcement member 145. The round portion 145R may be formed along curvature of the bending of the side frame 140.

The reinforcement member 145 may have a gap 145G. The gap 145G may be positioned adjacent to the round portion 145R. The gap 145G may provide flexibility for the reinforcement member 145. The gap 145G may be positioned adjacent to the round portion 145R and may extend along the reinforcement member 145. The gap 145G may extend in different directions. Namely, the gap 145G may form a cross line.

One side 1451 of the reinforcement member 145 may contact the inner frame 143LS1 of the first long side LS1, and the other side 1452 of the reinforcement member 145 may contact the inner frame 143SS2 of the second short side. Other sides 1453 and 1454 of the reinforcement member 145 may contact the inside of the outer frame 141. Hence, the reinforcement member 145 may provide the rigidity and flexibility for the side frame 140.

FIGS. 15 to 29 illustrate examples of assembling components of a display device according to an example embodiment of the invention.

Figure 15:
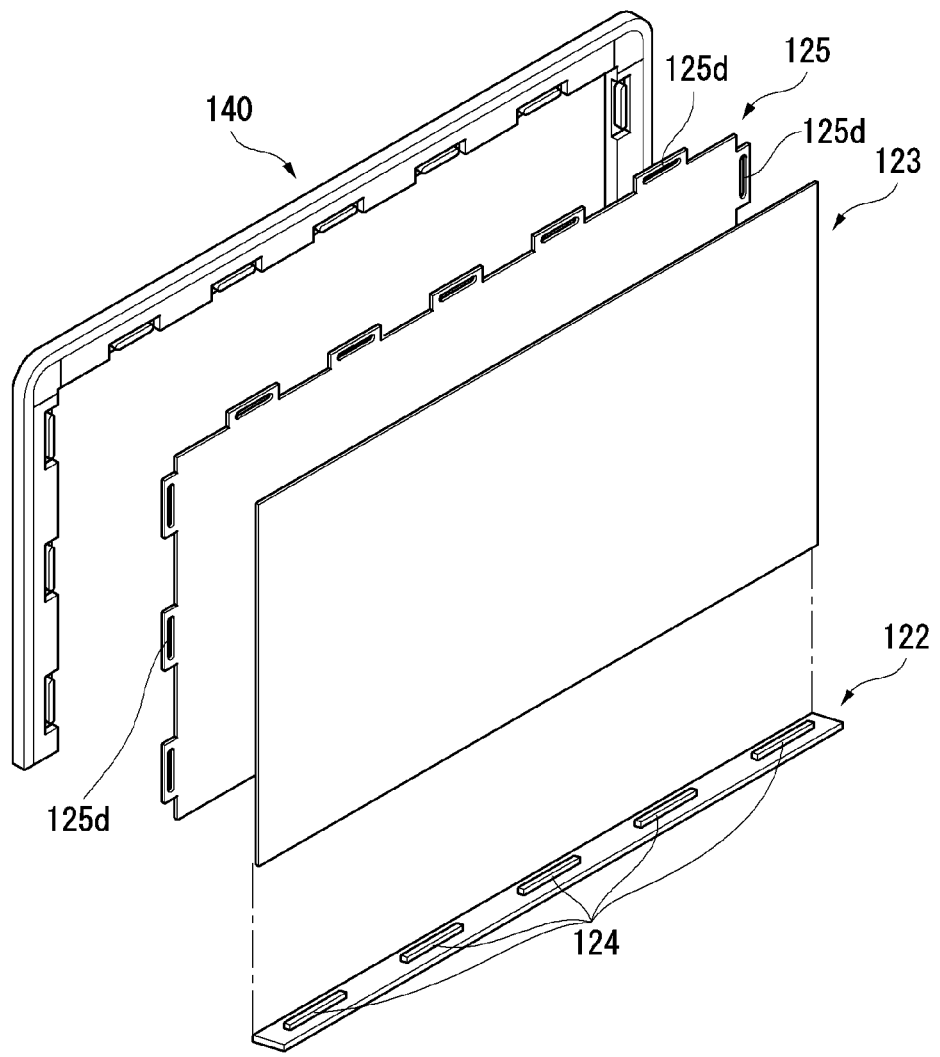
FIGS. 15, 16, 17, 18, 19, 20, 21, 22, 23, 24, 25, 26, 27, 28, and 29 illustrate examples of assembling components of a display device according to an example embodiment of the invention.

Referring to FIG. 15, an optical sheet 125 may be positioned on the inside of the side frame 140. The optical sheet 125 may be coupled with the side frame 140. The optical sheet 125 may be coupled with the inside of the side frame 140. The optical sheet 125 may be inserted into the groove 140h included in the side frame 140.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet. The optical sheet 125 may include at least one coupling portion 125d. The coupling portion 125d may be coupled with the groove 140h of the side frame 140. The coupling portion 125d may be formed on a first long side, a first short side, and/or a second short side of the optical sheet 125.

The optical sheet 125 may include a plurality of sheets having different functions. For example, the optical sheet 125 may include first to third optical sheets. The first optical sheet may function as a diffusion sheet, and the second and third optical sheets may function as a prism sheet. A number and/or a position of the diffusion sheets and the prism sheets may be changed. For example, the optical sheet 125 may include the first optical sheet as the diffusion sheet and the second optical sheet as the prism sheet.

The diffusion sheet may prevent light coming from a diffusion plate from being partially concentrated and may further uniformize a diffusion of the light. The prism sheet may concentrate light coming from the diffusion sheet and may make the concentrated light be vertically incident on the display panel 110.

The coupling portion 125d may be formed on at least one of edges of the optical sheet 125. The coupling portion 125d may be formed on at least one of the first to third optical sheets. The coupling portion 125d may be formed at an edge of the long side of the optical sheet 125. The coupling portions 125d formed on the first long side of the optical sheet 125 may be arranged irregularly. For example, a number and/or a position of the coupling portions 125d of the first long side may be different from a number and/or a position of the coupling portions 125d of the first or second short side.

At least one light assembly 124 may be mounted on a substrate 122. The substrate 122 may have an electrode pattern for connecting an adaptor to the light assembly 124. For example, a carbon nanotube electrode pattern for connecting the adaptor to the light assembly 124 may be formed on the substrate 122. The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assembly 124 may be a light emitting diode (LED) chip or a LED package including having at least one LED chip. The light assembly 124 may be configured as a colored LED emitting at least one of red, green, and blue light or a white LED. The colored LED may include at least one of a red LED, a green LED, and a blue LED.

A light source included in the light assembly 124 may be a COB (Chip-On-Board) type. The COB light source may be configured such that the LED chip as the light source is directly coupled with the substrate 122. Thus, a process may be simplified. Further, a resistance may be reduced, and a loss of energy resulting from heat may be reduced. Namely, power efficiency of the light assembly 124 may increase. The COB light source may provide the brighter lighting and may be implemented to be thinner and lighter than a related art.

An optical layer 123 may uniformly provide light provided by the light assembly 124 for the back surface of the display panel 110. Namely, the optical layer 123 may diffuse light provided by the light assembly 124. For example, the optical layer 123 may be a light guide plate. Light, which is provided for the optical layer 123 by the light assembly 124, may be totally reflected from the inside of the optical layer 123 and may be entirely dispersed on the optical layer 123. The optical layer 123 may be positioned in the rear of the optical sheet 125. The substrate 122 and/or the light assembly 124 may be positioned on one side of the optical layer 123. For example, the substrate 122 and/or the light assembly 124 may be positioned on a lower side of the optical layer 123.

Figure 16:
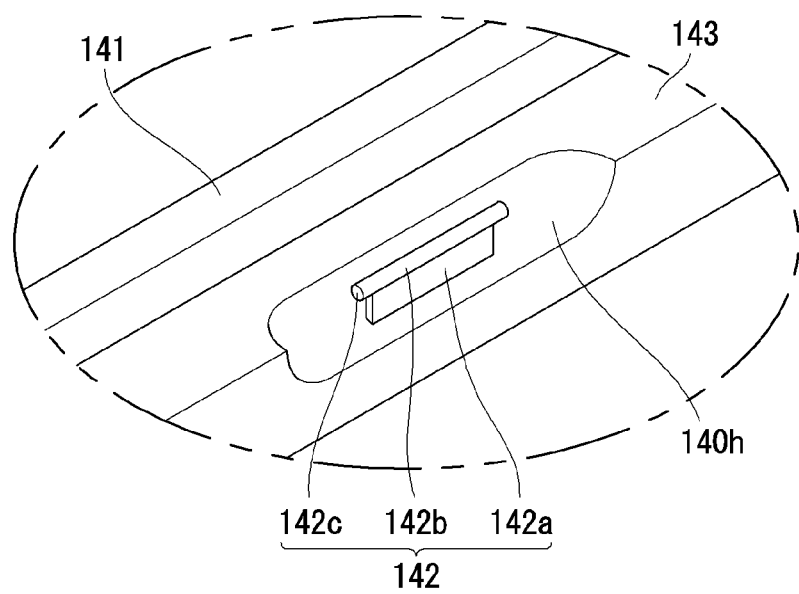
Figure 17:
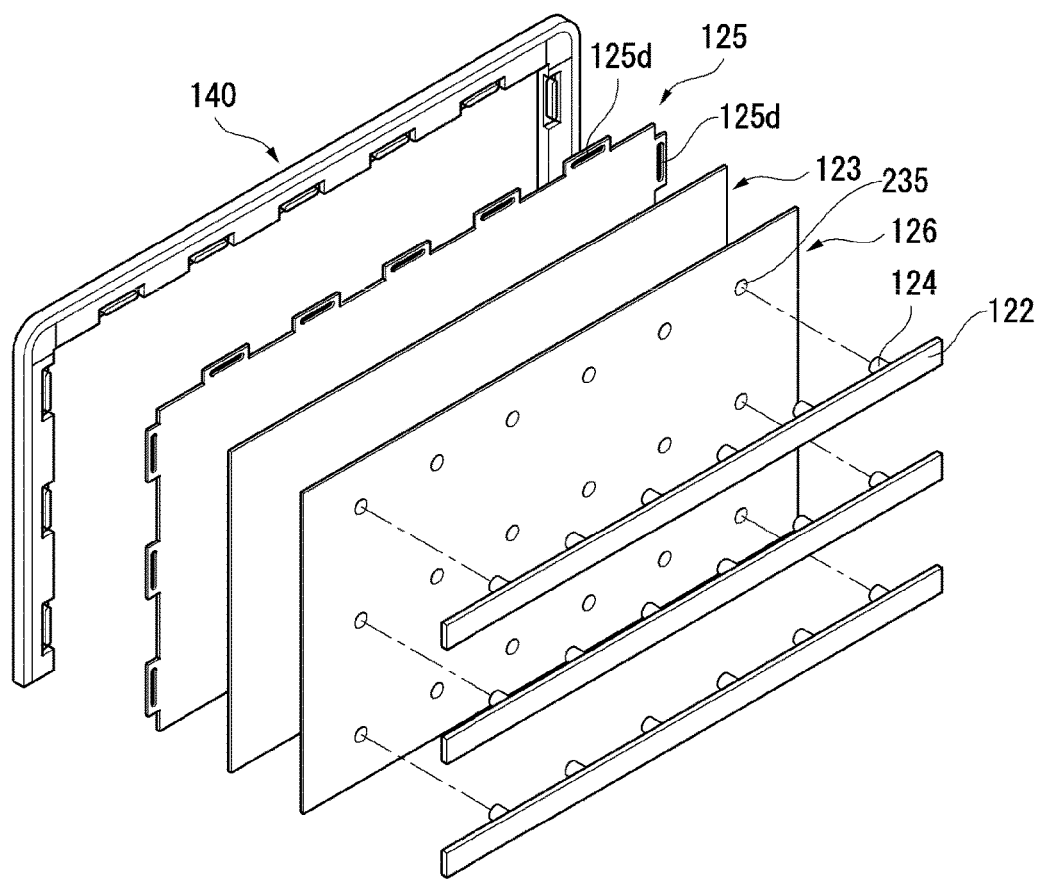

Referring to FIG. 16, a hanging portion 142 may be positioned in the groove 140h. The hanging portion 142 may be positioned in the groove 140h of the inner frame 143. The hanging portion 142 may include a supporter 142a, a pipe 142b, and a protrusion 142c. The supporter 142a may protrude from the groove 140h of the inner frame 143 and extend. A length of the supporter 142a may be substantially the same as or slightly different from a length of the coupling portion 125d of the optical sheet 125. Namely, a posture of the coupling portion 125d of the optical sheet 125 may be kept by the supporter 142a.

The pipe 142b may be positioned on the supporter 142a and may extend in an extension direction of the supporter 142a. A thickness of the pipe 142b may be greater than a thickness of the supporter 142a. Namely, the thickness of the pipe 142b may be greater than a width of the coupling portion 125d of the optical sheet 125. In other words, the pipe 142b may prevent the coupling portion 125d of the optical sheet 125 from being detached from the supporter 142a in a state where the coupling portion 125d of the optical sheet 125 is inserted into the supporter 142a. The protrusion 142c may be positioned at both ends of the pipe 142b. After the coupling portion 125d of the optical sheet 125 is inserted into the supporter 142a, or in other embodiments where the supporter 142a is inserted into the coupling portion 125d, the protrusion 142c may prevent more efficiently the optical sheet 125 from being detached from the supporter 142a Referring to FIG. 17, a reflective sheet 126 may be positioned on a front surface of the substrate 122. The reflective sheet 126 may be positioned in an area of the substrate 122 except a formation area of the light assembly 124. Namely, the reflective sheet 126 may have a plurality of holes 235.

The substrate 122 may be configured as a plurality of straps, which extend in the first direction and are separated from one another by a predetermined distance in the second direction perpendicular to the first direction.

The reflective sheet 126 may reflect light emitted from the light assembly 124 to the display panel 110. Further, the reflective sheet 126 may again reflect light reflected from the optical layer 123.

The reflective sheet 126 may include at least one of metal and metal oxide which are a reflection material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating the metal or the metal oxide on the substrate 122. An ink including the metal material may be printed on the reflective sheet 126. A deposition layer may be formed on the reflective sheet 126 using a heat deposition method, an evaporation method, or a vacuum deposition method such as a sputtering method. A coating layer and/or a printing layer may be formed on the reflective sheet 126 using a printing method, a gravure coating method or a silk screen method.

Figure 18:
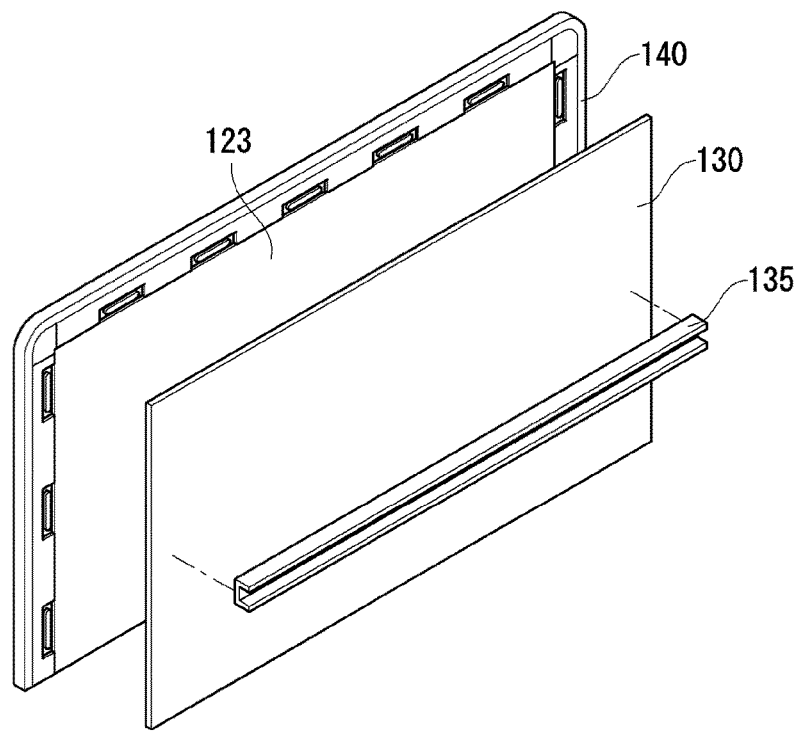

Referring to FIG. 18, the frame 130 may be coupled with the side frame 140. The frame 130 may be coupled with the inside of the side frame 140. The frame 130 may be fixed by a height difference generated by the outer frame 141 and the inner frame 143 of the side frame 140. Namely, the side of the frame 130 may contact the inside of the outer frame 141, and the front surface of the frame 130 may contact a back surface of the inner frame 143. A beam frame 135 may be coupled with a back surface of the frame 130. The beam frame 135 may be fixed to the back surface of the frame 130 through a rivet or a bolt. The beam frame 135 may be positioned on the back surface of the frame 130, and a portion of the back cover 150 may be fixed to the beam frame 135. Further, the power supply board 315, the main board 321, or the timing controller board 319 may be installed on the back surface of the frame 130 or in the rear of the frame 130 by the beam frame 135.

Figure 19:
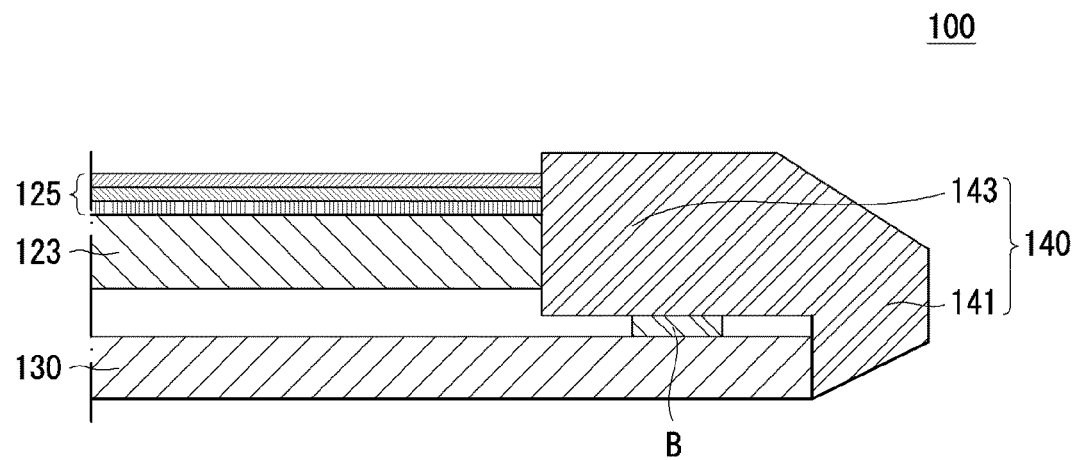

Referring to FIG. 19, the frame 130 may be coupled with the side frame 140. The frame 130 may be inserted into the side frame 140. The frame 130 may be pressed in the inside of the outer frame 141. Alternatively, the frame 130 may be bonded to the side frame 140. An adhesive member B may be positioned on a back surface of the inner frame 143 of the side frame 140. The frame 130 may be coupled with the side frame 140 by the adhesive member B included in the inner frame 143.

Figure 20:
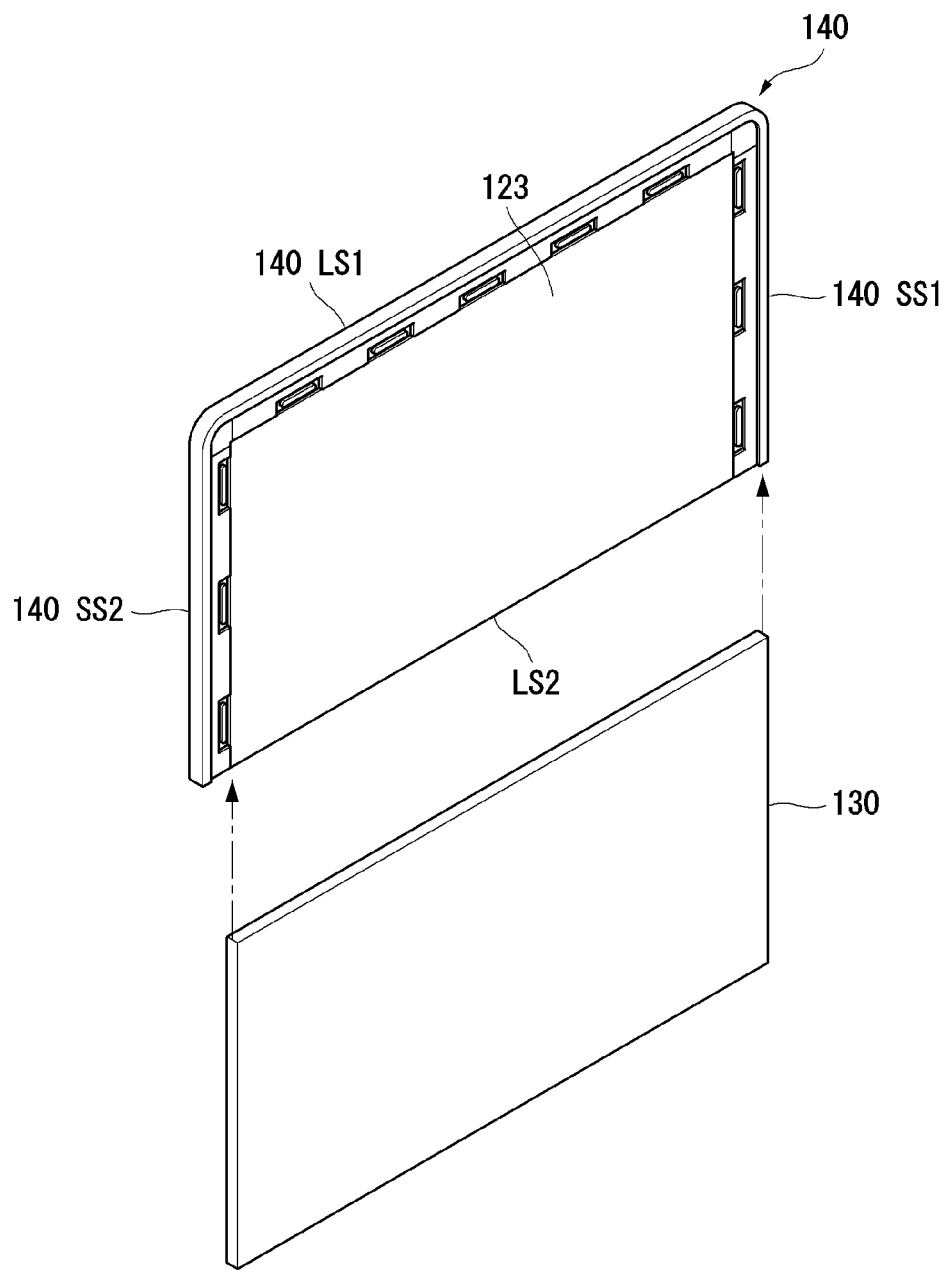

Referring to FIG. 20, the frame 130 may be coupled with the side frame 140 while sliding on the side frame 140. The frame 130 may slide from the second long side LS2 of the display device 100 to a first long side 140LS1 of the side frame 140 along a first short side 140SS1 and a second short side 140SS2 of the side frame 140. For this, the side frame 140 may include a coupling guide 148. This is described later.

Figure 21:
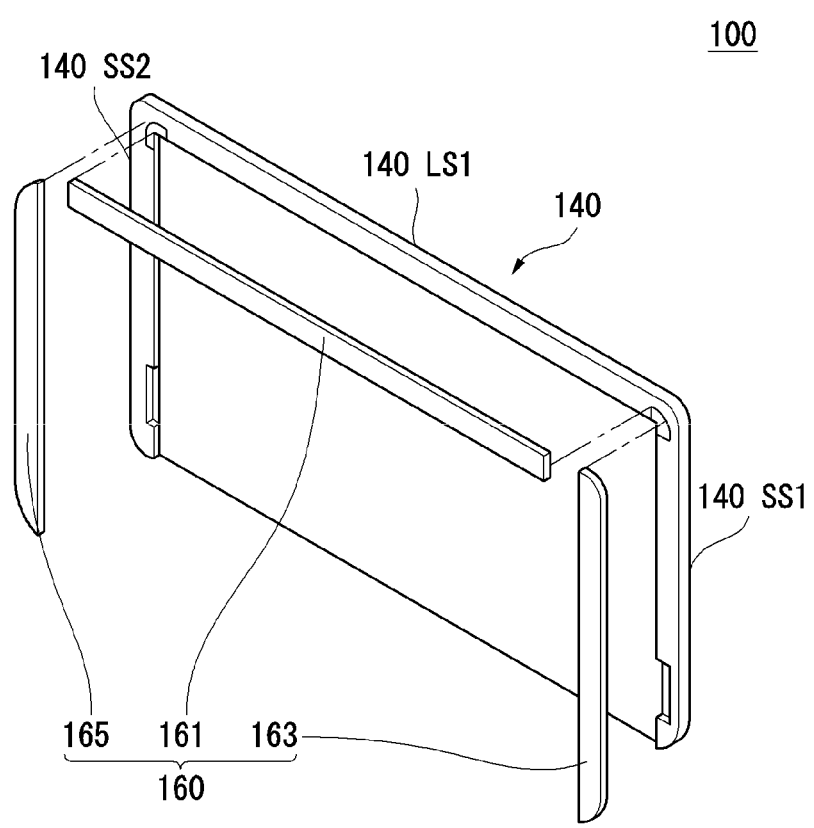

Referring to FIG. 21, an adhesive member 160 may be positioned on the front surface of the side frame 140. The adhesive member 160 may be attached to the front surface of the side frame 140. The adhesive member 160 may be positioned throughout the front surface of the side frame 140. For example, the adhesive member 160 may be a double-sided tape. A first adhesive member 161 may be attached to the first long side 140LS1 of the front surface of the side frame 140. A second adhesive member 163 may be attached to the first short side 140SS1 of the front surface of the side frame 140, and a third adhesive member 165 may be attached to the second short side 140SS2 of the front surface of the side frame 140. Namely, a portion of the front surface or the entire front surface of the side frame 140 may be the adhesive member 160.

Figure 22:
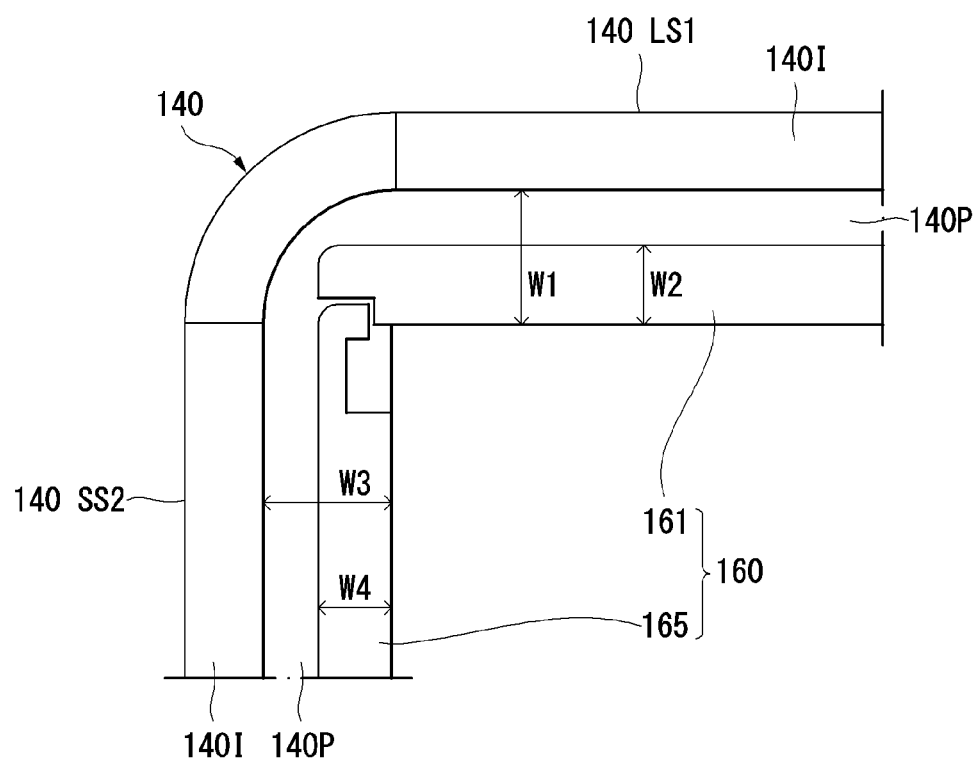

Referring to FIG. 22, the side frame 140 may include a flat portion 140P and an inclined portion 140I. The flat portion 140P may form the front surface of the side frame 140. The flat portion 140P may form the inside of the side frame 140. The inclined portion 140I may form a perimeter of the side frame 140. The adhesive member 160 may be positioned on the front surface of the side frame 140. The adhesive member 160 may be positioned on the flat portion 140P of the side frame 140.

The first adhesive member 161 may be attached to the flat portion 140P positioned on the first long side 140LS1 of the side frame 140. A width W2 of the first adhesive member 161 may be less than a width W1 of the flat portion 140P positioned on the first long side 140LS1. The third adhesive member 165 may be attached to the flat portion 140P positioned on the second short side 140SS2 of the side frame 140. A width W4 of the third adhesive member 165 may be less than a width W3 of the flat portion 140P positioned on the second short side 140SS2. Namely, a width of the adhesive member 160 may be within a range of a width of the flat portion 140P of the side frame 140.

Figure 23:
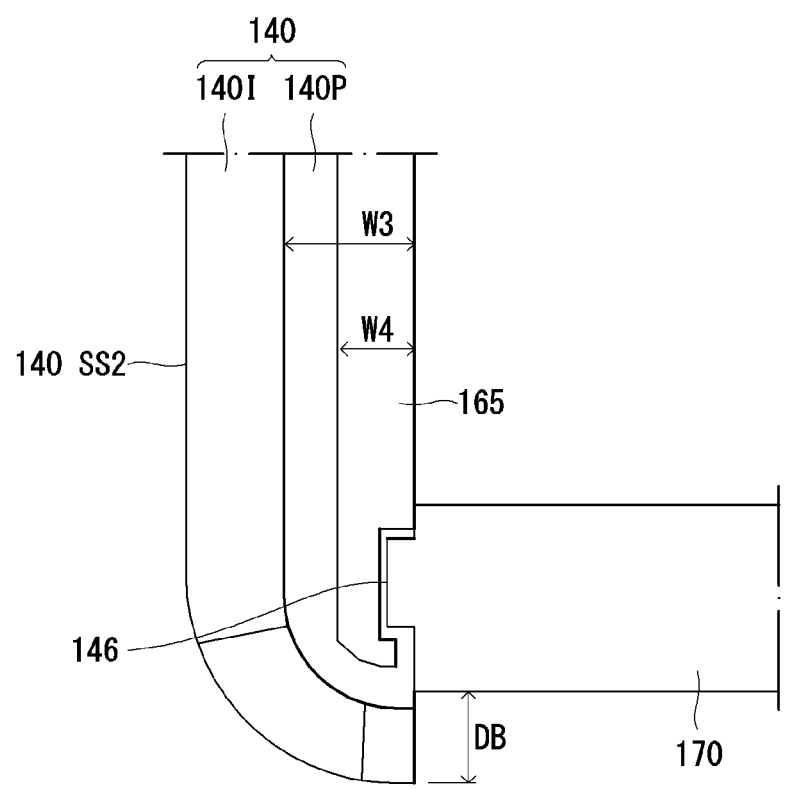
Figure 24:
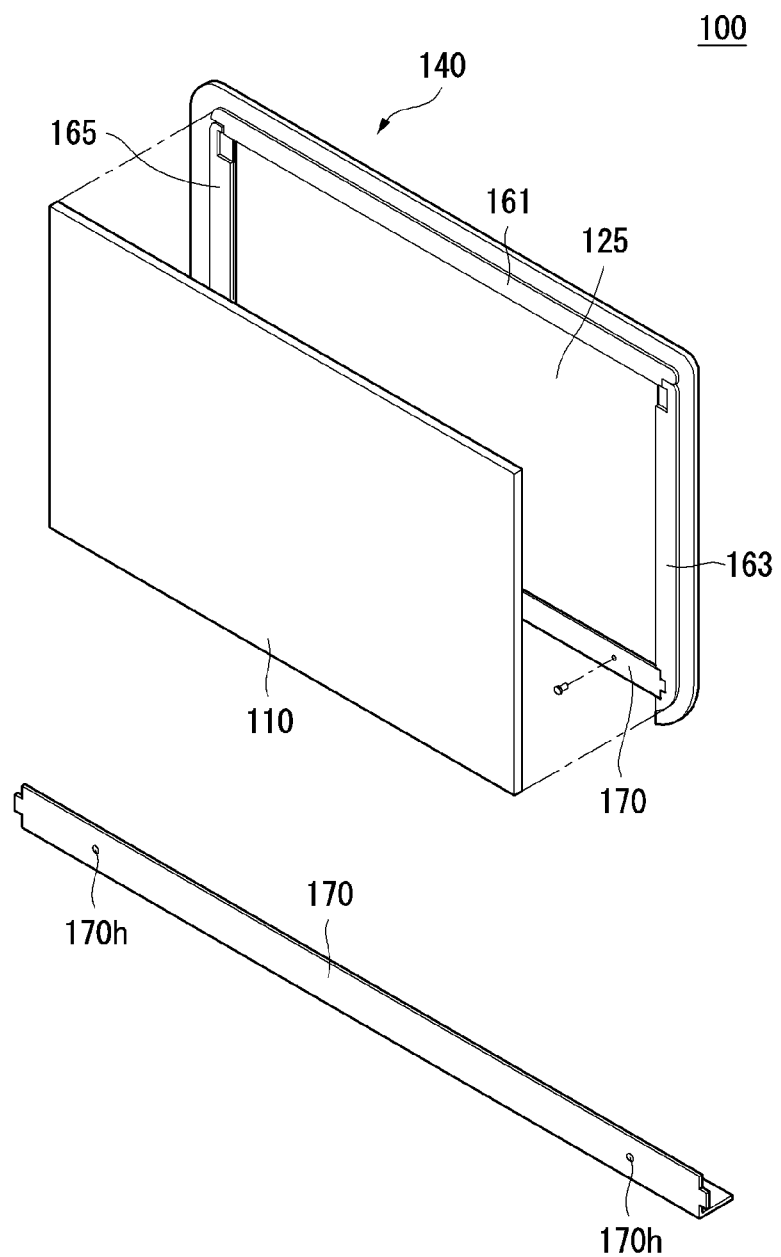

Referring to FIGS. 23 and 24, a bracket 170 may be coupled with a groove 146 of the side frame 140. One end of the bracket 170 may be inserted into a groove 146 formed at one end of the second short side 140SS2 of the side frame 140. The bracket 170 may be separated from one end of the side frame 140 by a predetermined distance DB. The bracket 170 may be coupled with the frame 130 through a bolt.

The display panel 110 may be coupled with the front surface of the side frame 140. The display panel 110 may be fixed to the front surface of the side frame 140. The display panel 110 may be attached to the front surface of the side frame 140. The display panel 110 may be fixed to the front surface of the side frame 140 through the adhesive members 161, 163, and 165.

Namely, the display panel 110 may be coupled with the side frame 140 at the outside of the side frame 140. Hence, all of the sides of the display panel 110 may be exposed to the outside.

In another point of view, the back surface of the display panel 110 may not be observed from the outside due to the side frame 140 and/or the frame 130. On the other hand, the front surface and the side surface of the display panel 110 may be observed from the outside. Namely, the display panel 110 may be positioned on the outside of the side frame 140 and/or the frame 130.

Figure 25:
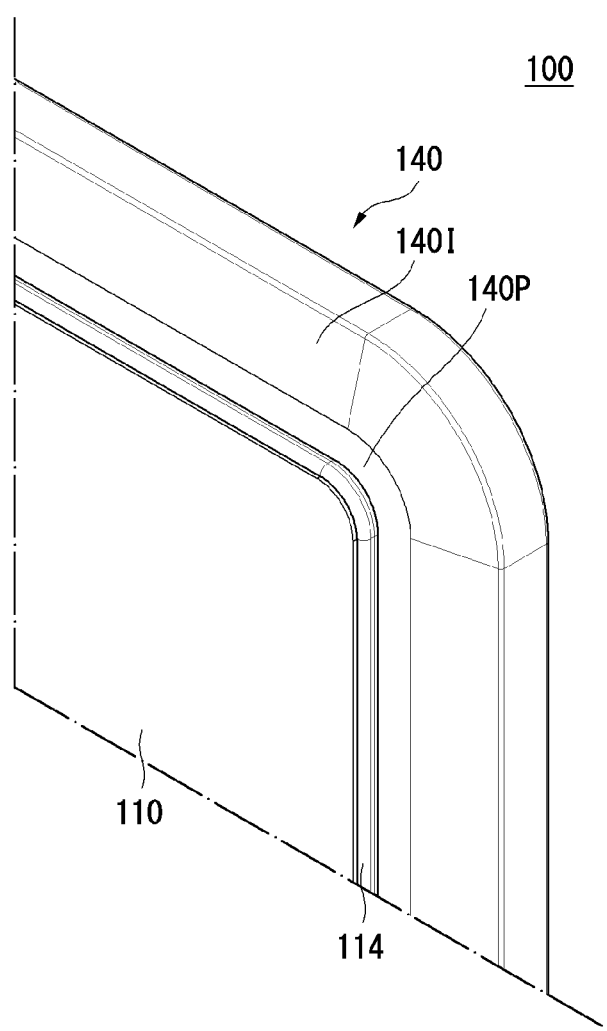

Referring to FIG. 25, a panel cover 114 may be positioned on the side of the display panel 110. The panel cover 114 may cover the side of the display panel 110. The panel cover 114 may be fixed to the side of the display panel 110. The panel cover 114 may be inserted into a perimeter of the side of the display panel 110. The panel cover 114 may be attached to the perimeter of the side of the display panel 110. For example, the panel cover 114 may be formed of synthetic resin including an elastic material. Hence, the panel cover 114 may prevent the side of the display panel 110 from being damaged by an external force or an external impact. The panel cover 114 may be referred to as a sealing member.

Figure 26:
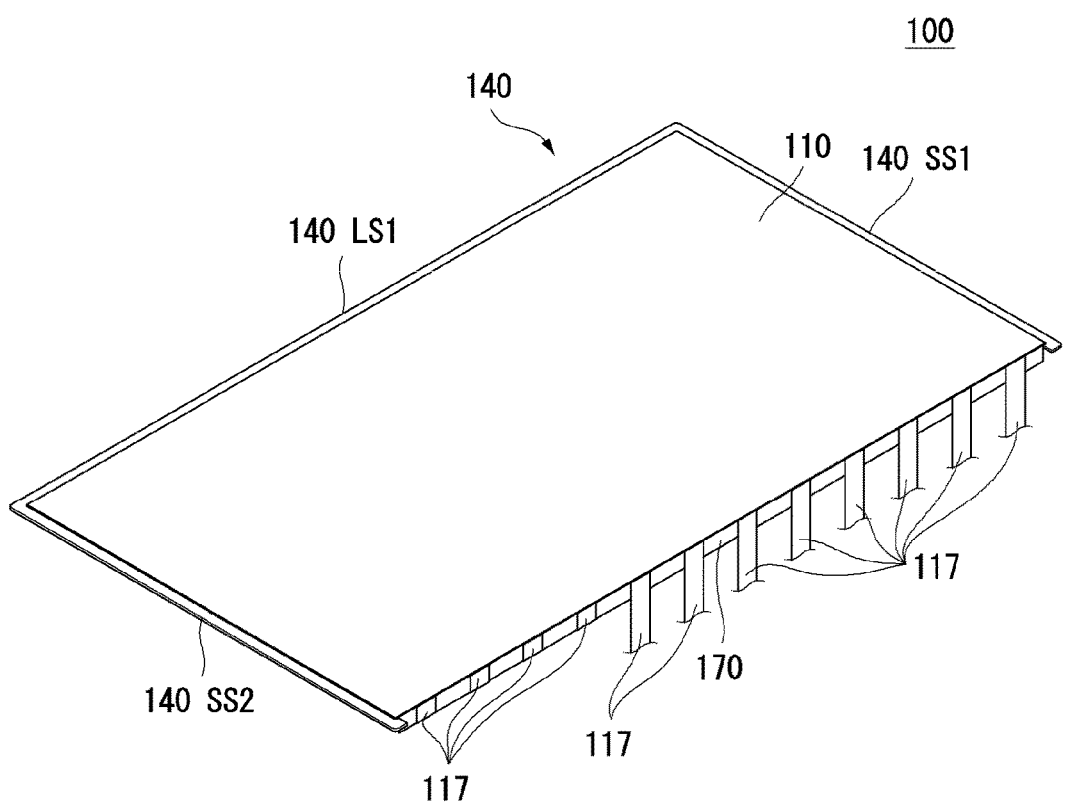

Referring to FIG. 26, a member layer 117 may extend from the display panel 110. For example, the member layer 117 may be a FPCB. The plurality of member layers 117 may extend from the display panel 110. For example, the twelve member layers 117 may extend from the side of the display panel 110, cover the bracket 170, and face toward the rear of the display device 100. The member layer 117 may extend from the side of the display panel 110. The member layer 117 may extend while covering the bracket 170. The member layer 117 may cover one surface of the bracket 170. The member layer 117 may cover the bracket 170 and extend toward the rear or the back surface of the display device 100.

Figure 27:
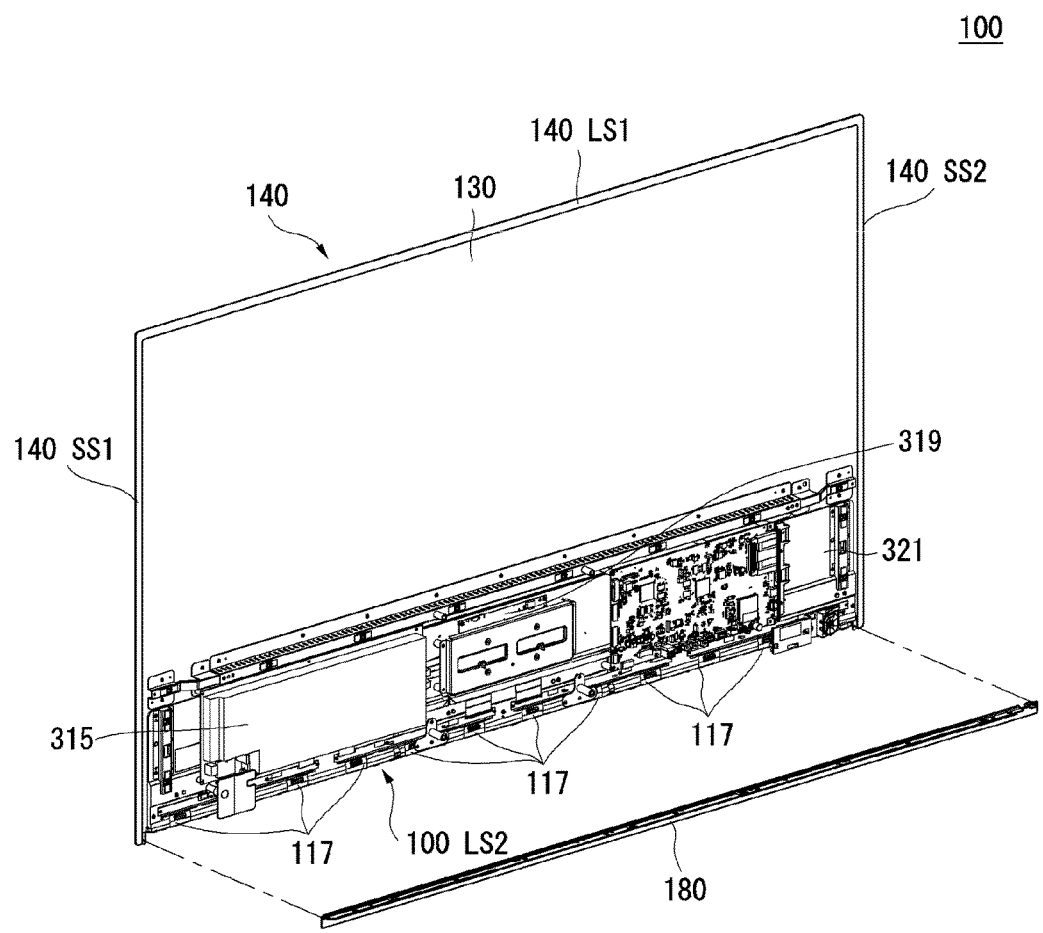

Referring to FIG. 27, a bottom frame 180 may be positioned on the second long side LS2 of the display device 100. The bottom frame 180 may be installed on a lower part of the display device 100. The bottom frame 180 may be positioned on a lower side of the display panel 110. The bottom frame 180 may be positioned adjacent to a lower surface of the display panel 110. The bottom frame 180 may cover the lower surface of the display panel 110. The bottom frame 180 may be coupled with the side frame 140. Both ends of the bottom frame 180 may be connected to the side frame 140. Both ends of the bottom frame 180 may be fixed to both lower ends of the side frame 140. The bottom frame 180 may cover the member layer 117 extended from the display panel 110. Namely, the member layer 117 may be positioned between the lower side of the display panel 110 and the bottom frame 180.

Figure 28:
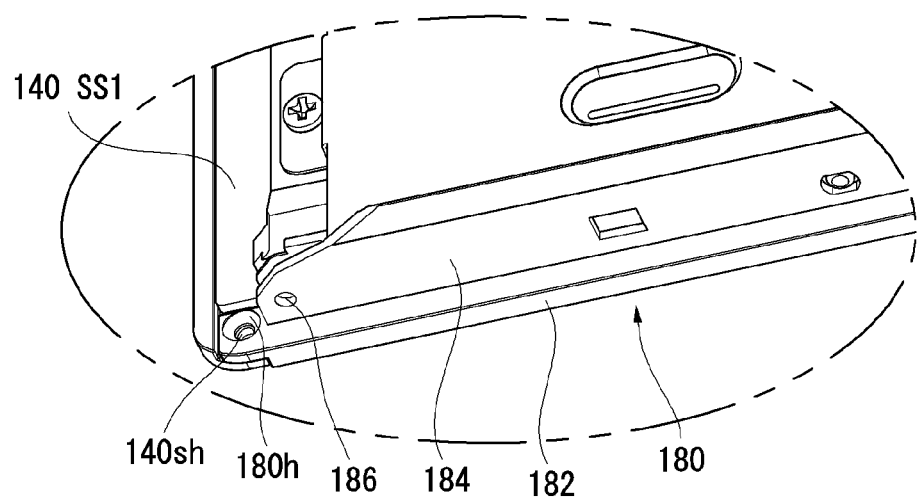

Referring to FIG. 28, the bottom frame 180 may include a front frame 182 and a back frame 184. The front frame 182 may cover the front surface and/or an upper surface of the display device 100, and the back frame 184 may cover the back surface and/or a lower surface of the display device 100. The front frame 182 may have a hole 180$h$ at its both ends. The front frame 182 may be referred to as a vertical frame, and the back frame 184 may be referred to as a horizontal frame. The front frame 182 may form an entire horizontal surface of the bottom frame 180, and the back frame 184 may from an entire vertical surface of the bottom frame 180.

The front frame 182 may be coupled with the side frame 140. The front frame 182 may be coupled with both lower ends of the side frame 140. The side frame 140 may have a hole 140$sh$ at its both lower ends. The hole 180$h$ of the front frame 182 may matched to the hole 140sh of the side frame 140. The bottom frame 180 may be coupled with the side frame 140 by inserting a screw into the hole 180h of the front frame 182 and the hole 140sh of the side frame 140.

The back frame 184 may have a hole 186. The back frame 184 may have the hole 186 at its one end or both ends.

Figure 29:
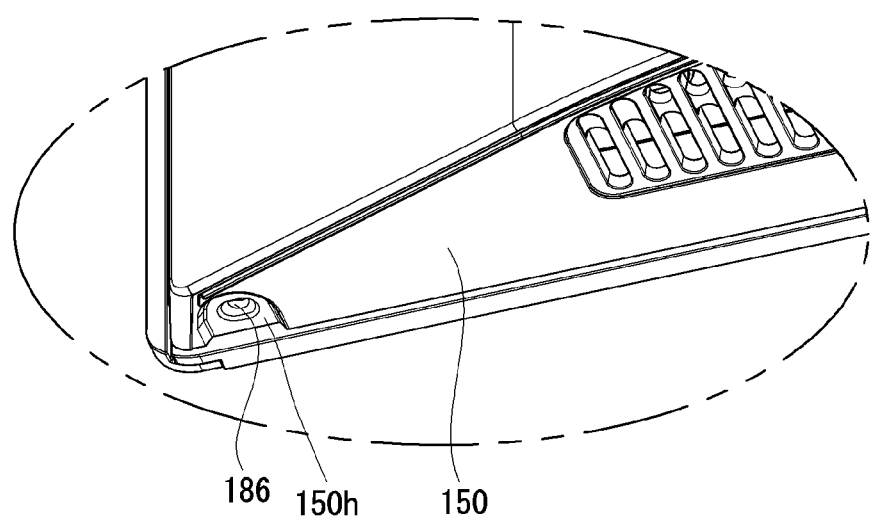

Referring to FIG. 29, the back cover 150 may be positioned in the rear of the display device 100. The back cover 150 may be coupled with the back surface of the frame 130. The back cover 150 may be coupled with the bottom frame 180. The back cover 150 may be fixed to the back frame 184. The back cover 150 may have a hole 150h at its both ends. The hole 150h of the back cover 150 may be matched to the hole 186 of the back frame 184. The back cover 150 may be fixed to the bottom frame 180 by inserting a screw into the hole 150h of the back cover 150 and the hole 186 of the back frame 184.

FIGS. 30 to 39 illustrate examples of a cross section of a display device according to an example embodiment of the invention.

Figure 30:
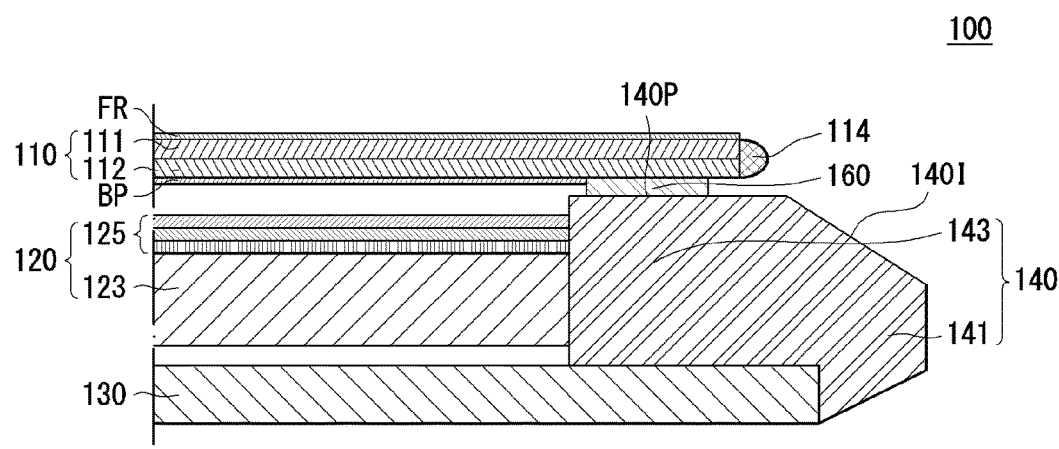
FIGS. 30, 31, 32, 33, 34, 35, 36, 37, 38, and 39 illustrate examples of a cross section of a display device according to an example embodiment of the invention.

Referring to FIG. 30, a side frame 140 may be positioned on one side of a main frame 130. The side frame 140 may be positioned adjacent to the side of the main frame 130. An outer frame 141 may contact the side of the main frame 130. An inner frame 143 may be positioned adjacent to an edge of a front surface of the main frame 130. A height difference may be formed between the outer frame 141 and the inner frame 143.

The side frame 140 may include a flat portion 140P and an inclined portion 140I. The flat portion 140P may be formed on a front surface of the side frame 140. The flat portion 140P may be positioned on the inside of the front surface of the side frame 140. The inclined portion 140I may be connected from the flat portion 140P to the outside of the side frame 140. The inclined portion 140I may be positioned on the outside of the side frame 140.

An adhesive member 160 may be positioned on the front surface of the side frame 140. The adhesive member 160 may be fixed to the front surface of the side frame 140. The adhesive member 160 may be fixed to the flat portion 140P. The display panel 110 may be placed on the adhesive member 160. The display panel 110 may be fixed to the side frame 140 through the adhesive member 160. The display panel 110 may be fixed to the front surface of the side frame 140 through the adhesive member 160.

The display panel 110 may include the front substrate 111 and the back substrate 112. The front substrate 111 may be positioned opposite the back substrate 112. The display panel 110 may include a polarization layer on its front surface or back surface. The display panel 110 may include a first polarization layer FP and a second polarization layer BP. The first polarization layer FP may cover the front substrate 111, and the second polarization layer BP may cover the back substrate 112.

The side of the display panel 110 may be exposed to the outside. The side of the display panel 110 may be positioned on the outside of the side frame 140. The panel cover 114 may cover the exposed side of the display panel 110. The exposed side of the display panel 110 may be covered by the panel cover 114.

The backlight unit 120 may be positioned between the display panel 110 and the main frame 130. The backlight unit 120 may be positioned on the inside of the side frame 140. The backlight unit 120 may be positioned between the display panel 110, the main frame 130, and the side frame 140. The backlight unit 120 may include an optical layer 123 and an optical sheet 125. The optical layer 123 may be positioned adjacent to the main frame 130, and the optical sheet 125 may be positioned adjacent to the display panel 110. The optical layer 123 may be positioned between the main frame 130 and the display panel 110, and the optical sheet 125 may be positioned between the optical layer 123 and the display panel 110.

Figure 31:
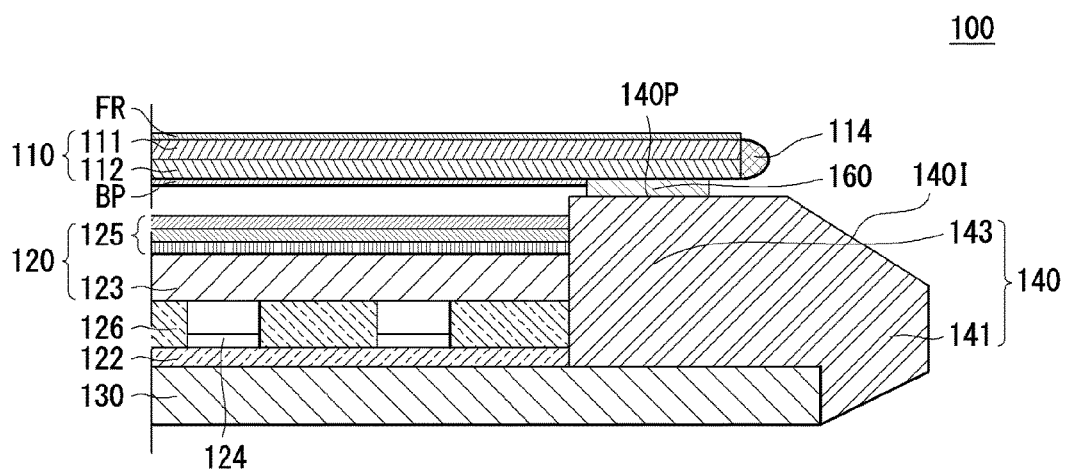

Referring to FIG. 31, a side frame 140 may be positioned on one side of a main frame 130. The side frame 140 may be positioned adjacent to the side of the main frame 130. An outer frame 141 may contact the side of the main frame 130. An inner frame 143 may be positioned adjacent to an edge of a front surface of the main frame 130. A height difference may be formed between the outer frame 141 and the inner frame 143.

The side frame 140 may include a flat portion 140P and an inclined portion 140I. The flat portion 140P may be formed on a front surface of the side frame 140. The flat portion 140P may be positioned on the inside of the front surface of the side frame 140. The inclined portion 140I may be connected from the flat portion 140P to the outside of the side frame 140. The inclined portion 140I may be positioned on the outside of the side frame 140.

An adhesive member 160 may be positioned on the front surface of the side frame 140. The adhesive member 160 may be fixed to the front surface of the side frame 140. The adhesive member 160 may be fixed to the flat portion 140P. The display panel 110 may be placed on the adhesive member 160. The display panel 110 may be fixed to the side frame 140 through the adhesive member 160. The display panel 110 may be fixed to the front surface of the side frame 140 through the adhesive member 160.

The display panel 110 may include the front substrate 111 and the back substrate 112. The front substrate 111 may be positioned opposite the back substrate 112. The display panel 110 may include a polarization layer on its front surface or back surface. The display panel 110 may include a first polarization layer FP and a second polarization layer BP. The first polarization layer FP may cover the front substrate 111, and the second polarization layer BP may cover the back substrate 112.

The side of the display panel 110 may be exposed to the outside. The side of the display panel 110 may be positioned on the outside of the side frame 140. The panel cover 114 may cover the exposed side of the display panel 110. The exposed side of the display panel 110 may be covered by the panel cover 114.

The backlight unit 120 may be positioned between the display panel 110 and the main frame 130. The backlight unit 120 may be positioned on the inside of the side frame 140. The backlight unit 120 may be positioned between the display panel 110, the main frame 130, and the side frame 140. The backlight unit 120 may include a reflective sheet 126, an optical layer 123, an optical sheet 125, a substrate 122, and a light assembly 124.

The substrate 122 may be positioned adjacent to the main frame 130. The substrate 122 may be positioned on a front surface of the main frame 130. The substrate 122 may contact the front surface of the main frame 130. The light assembly 124 may be mounted on the substrate 122. The plurality of light assemblies 124 may be mounted on the substrate 122.

The reflective sheet 126 may be placed on the substrate 122. The light assembly 124 may be positioned on the inside of the reflective sheet 126. The light assembly 124 mounted on the substrate 122 may be inserted into the inside of the reflective sheet 126.

The optical layer 123 may be positioned between the reflective sheet 126 and the optical sheet 125, and the optical sheet 125 may be positioned adjacent to the display panel 110. The optical layer 123 may be positioned between the reflective sheet 126 and the display panel 110, and the optical sheet 125 may be positioned between the optical layer 123 and the display panel 110.

Structures and components identical or equivalent to those described above are designated with the same reference numerals, and a further description may be briefly made or may be entirely omitted.

Figure 32:
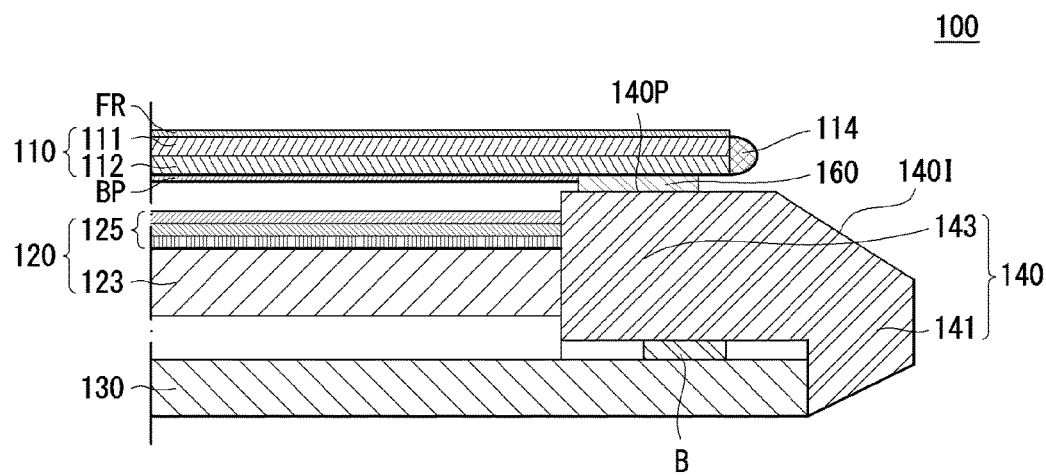
Figure 33:
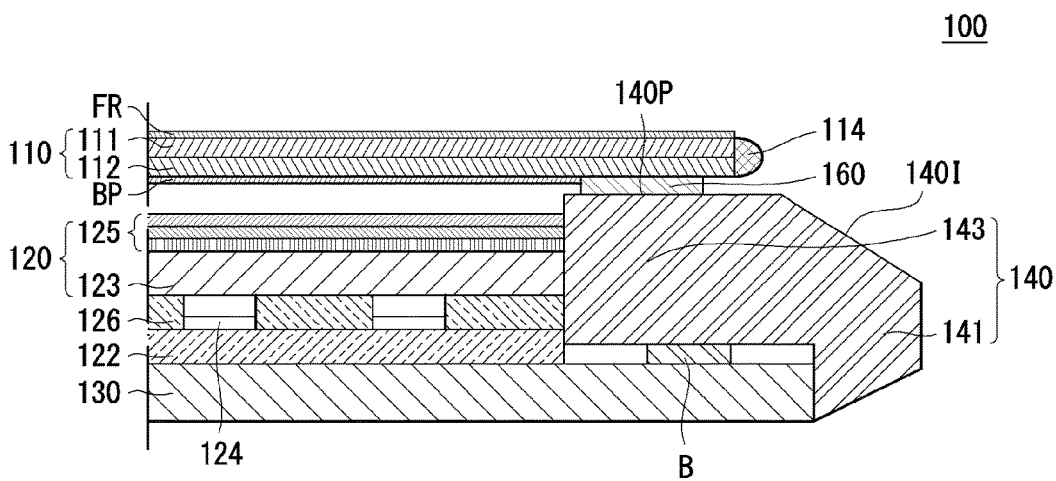

Referring to FIGS. 32 and 33, a main frame 130 may be bonded to a side frame 140. An adhesive member B may be fixed to a back surface of the side frame 140, and the main frame 130 may be fixed to the adhesive member B. The main frame 130 may be pressed in the side frame 140 and may be bonded to the side frame 140.

Figure 34:
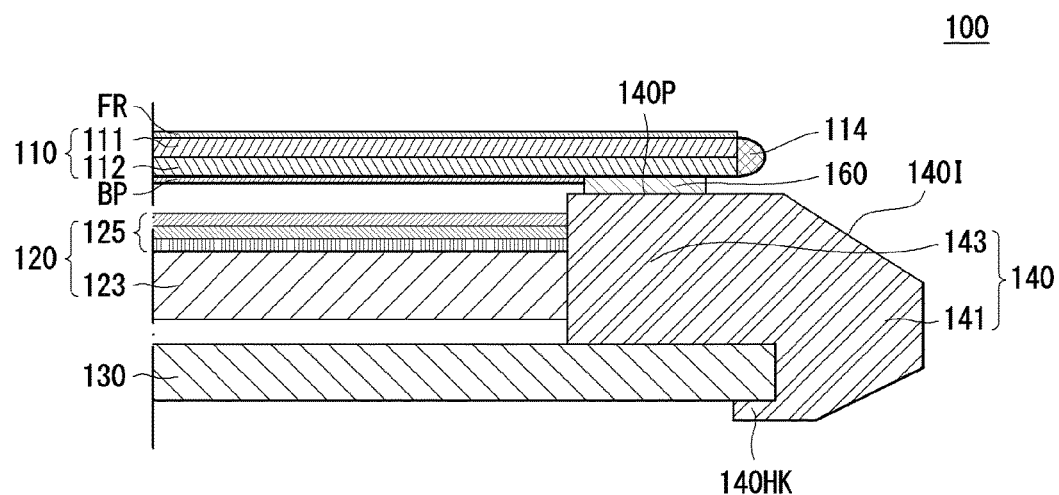
Figure 35:
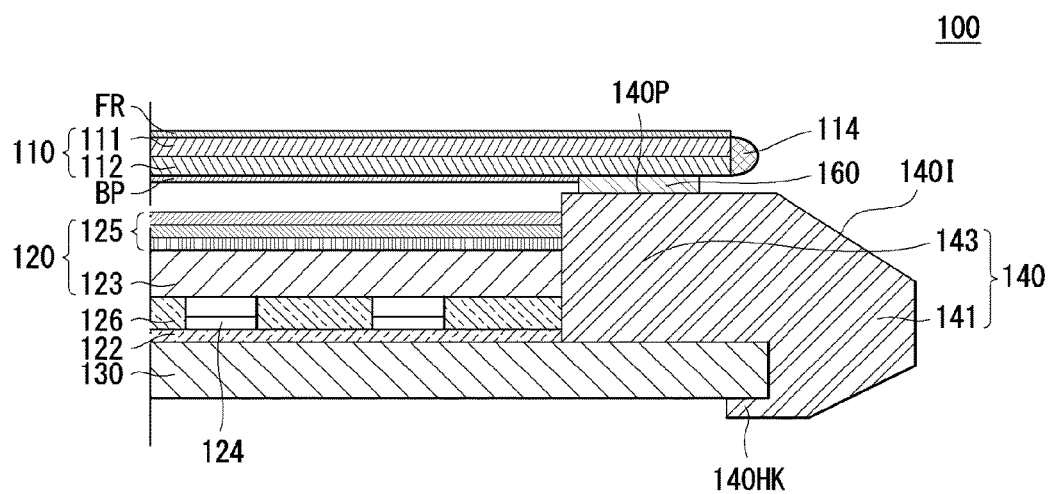

Referring to FIGS. 34 and 35, the side frame 140 may have a coupling protrusion 140HK. The coupling protrusion 140HK may protrude toward the inside of the side frame 140. The coupling protrusion 140HK may protrude from a back surface of the side frame 140 to the inside of the side frame 140. The coupling protrusion 140HK may be adjacent to an edge of a back surface of the main frame 130 and may be positioned at the side frame 140. The coupling protrusion 140HK may extend along a longitudinal direction of the side frame 140. Hence, the main frame 130 may be inserted into the side frame 140.

An outer frame 141 may have a coupling protrusion 140HK. The coupling protrusion 140HK may protrude toward the inside of the outer frame 141 or the inside of the side frame 140. The coupling protrusion 140HK may be adjacent to the edge of the back surface of the main frame 130 and may be positioned at the outer frame 141. The coupling protrusion 140HK may extend along a longitudinal direction of the outer frame 141.

Figure 36:
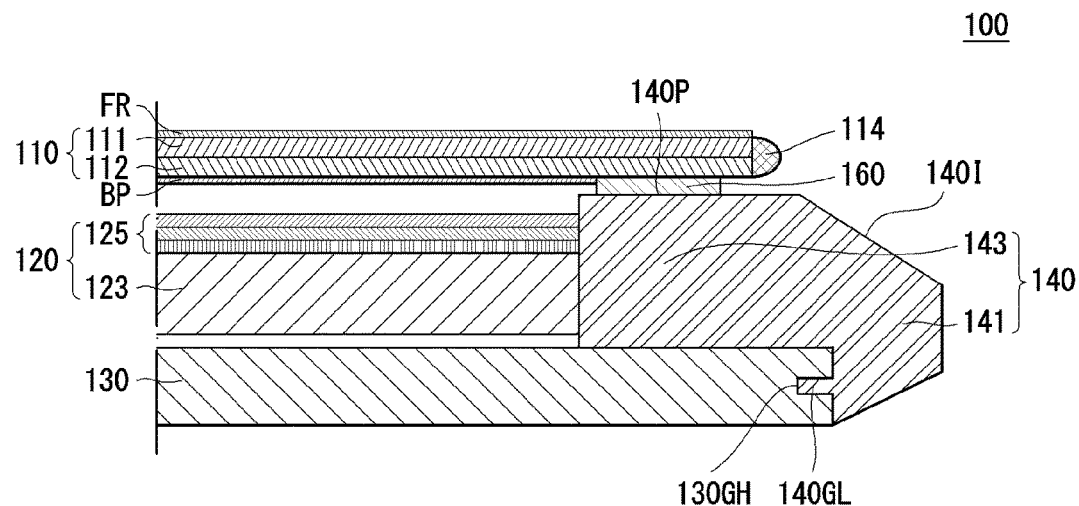
Figure 37:
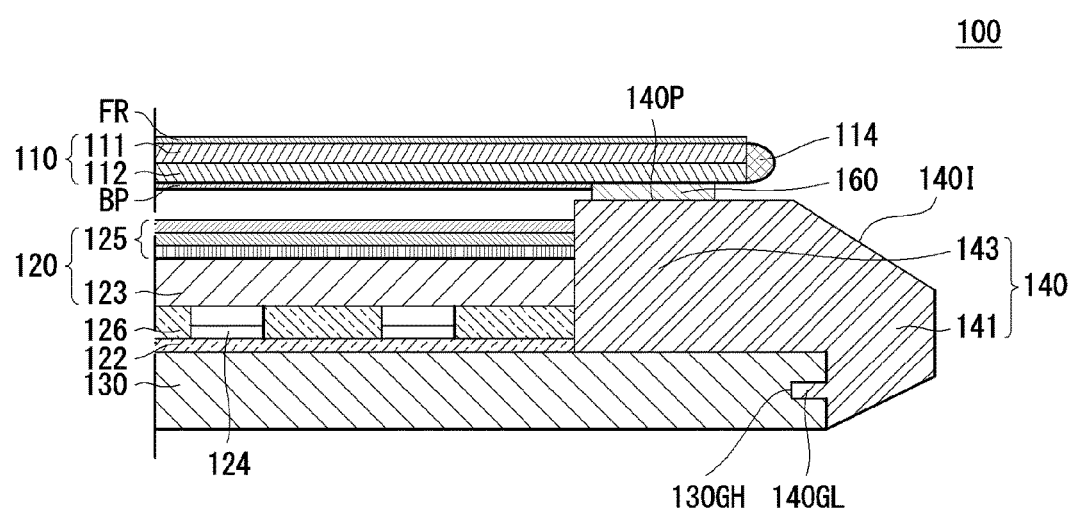

Referring to FIGS. 36 and 37, the side frame 140 may have a guide protrusion 140GL. The guide protrusion 140GL may protrude toward the inside of the side frame 140. The guide protrusion 140GL may protrude along the longitudinal direction of the side frame 140. The guide protrusion 140GL may protrude toward the inside of the outer frame 141. The guide protrusion 140GL may be positioned in parallel with the inner frame 143.

The main frame 130 may have a guide groove 130GL. The guide groove 130GL may be formed by depressing the side of the main frame 130. The guide groove 130GL may extend along the longitudinal direction of the side frame 140. The guide groove 130GL may be formed on the inside of the outer frame 141. The guide groove 130GL may extend along an extension direction of the outer frame 141 at the inside of the outer frame 141. The guide protrusion 140GL may be inserted into the guide groove 130GL. Hence, the main frame 130 may be inserted into the side frame 140.

Figure 38:
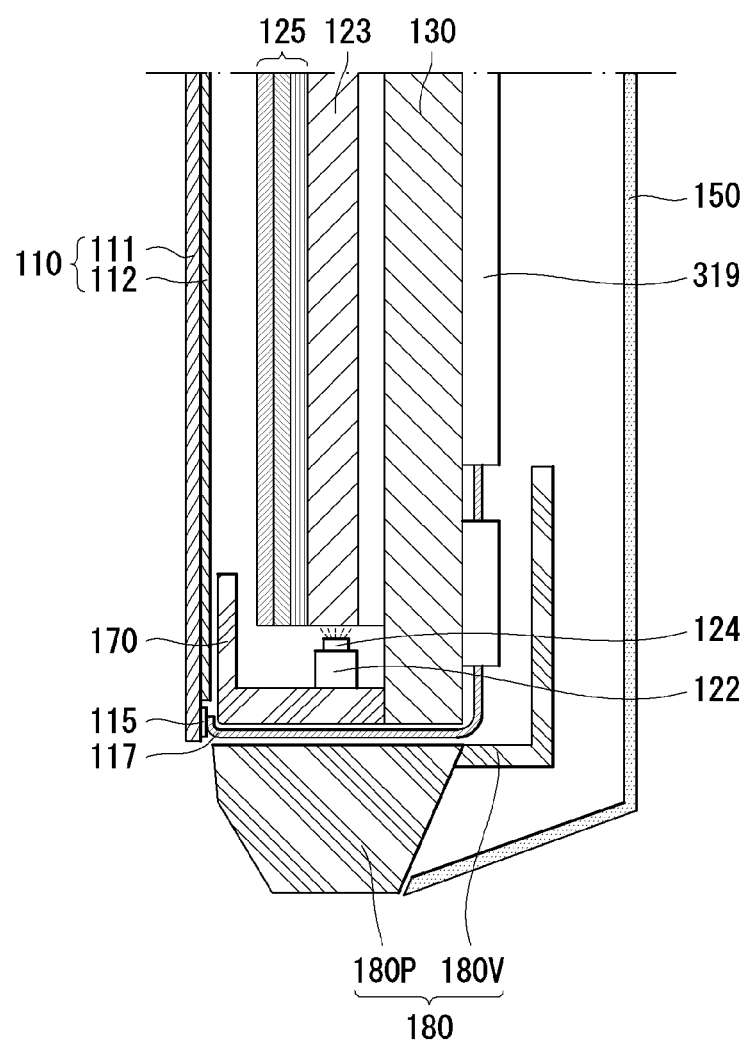

Referring to FIG. 38, a controller or a timing controller board 319 included in a controller may be installed in the rear of the main frame 130. A bracket 170 may be coupled with a lower part or a lower side of the main frame 130. The bracket 170 may be coupled with a front surface of the lower part of the main frame 130. The bracket 170 may be coupled with a lower end of the main frame 130.

An optical layer 123 may be positioned in front of the main frame 130. An optical sheet 125 may be positioned in front of the optical layer 123. The optical sheet 125 may be positioned on a front surface of the optical layer 123. A light assembly 124 may be positioned under the optical layer 123. The light assembly 124 may be positioned adjacent to a lower surface of the optical layer 123. The light assembly 124 may provide light for the lower surface of the optical layer 123. The optical layer 123 and/or the optical sheet 125 may make light provided by the light assembly 124 travel toward the display panel 110. The light assembly 124 may be mounted on a substrate 122.

The display panel 110 may be positioned in front. An upper side, a lower side, and left and right sides of the display panel 110 may be exposed to the outside. The display panel 110 may include the front substrate 111 and the back substrate 112. An area of the front substrate 111 may be greater than an area of the back substrate 112. The back substrate 112 may cover a back surface of the front substrate 111 and expose a portion of the front substrate 111 to the outside. An electrode 115 may be formed on the exposed portion of the front substrate 111. The electrode 115 may be electrically connected to an electrode line EL formed on the front substrate 111.

A member layer 117 may be electrically connected to the electrode 115. The member layer 117 may contact the electrode 115. The member layer 117 may extend from the electrode 115 toward the rear of the main frame 130. The member layer 117 may be positioned adjacent to a lower surface of the bracket 170. The member layer 117 may surround a portion of the lower surface of the bracket 170 and extend toward the rear of the main frame 130. The member layer 117 may cover a portion of the lower surface of the bracket 170. The member layer 117 may be electrically connected to the controller, for example, the timing controller board 319.

A bottom frame 180 may form a lower part of the display device 100. The bottom frame 180 may be positioned under the bracket 170. The bottom frame 180 may be positioned opposite a lower surface of the bracket 170. The bottom frame 180 may be positioned under the main frame 130. The bottom frame 180 may cover the member layer 117. The bottom frame 180 may include a horizontal portion 180P and a vertical portion 180V. The horizontal portion 180P may be positioned at a lower end of the main frame 130. The horizontal portion 180P may be positioned adjacent to the lower surface of the bracket 170. The horizontal portion 180P may cover the member layer 117. The horizontal portion 180P may protect the display device 100 from an impact which may be generated in the lower part of the display device 100. The vertical portion 180V may be positioned in the rear of the main frame 130. More specifically, the vertical portion 180V may be positioned in the rear of the main frame 130 by extending from the horizontal portion 180P and bending. The vertical portion 180V may cover the member layer 117 positioned in the rear of the main frame 130.

A back cover 150 may form a portion of the back surface of the display device 100. The back cover 150 may be connected to the bottom frame 180. One side of the back cover 150 may be coupled with the main frame 130, and the other side may be coupled with the bottom frame 180.

Figure 39:
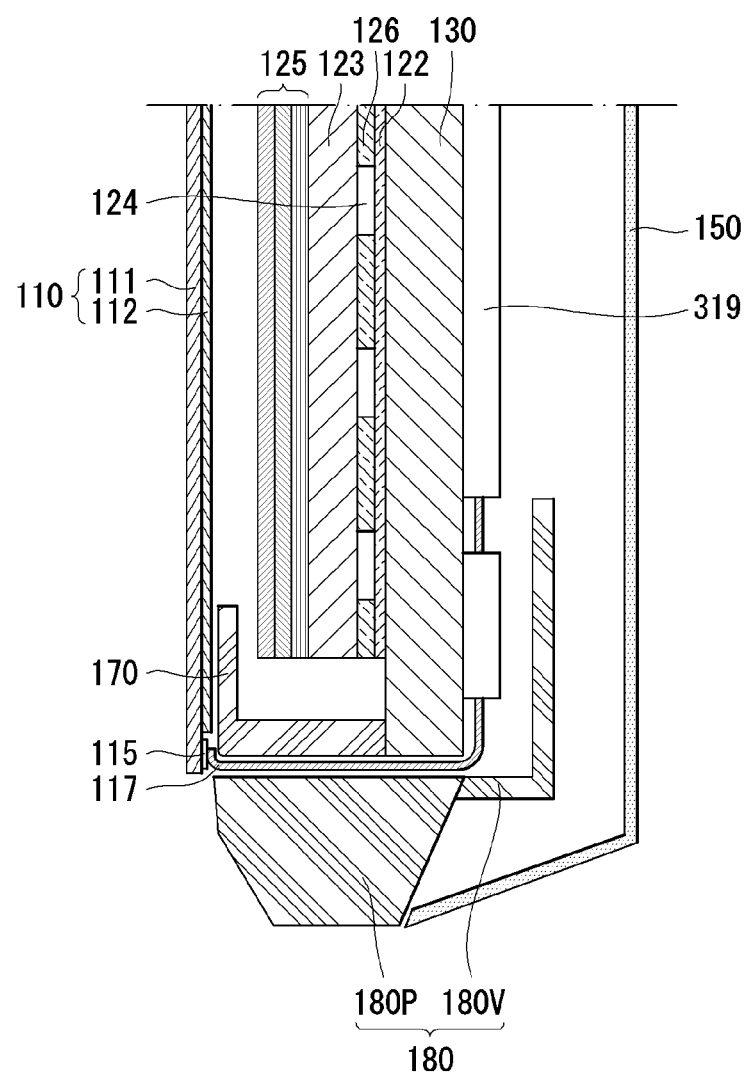

Referring to FIG. 39, a controller or a timing controller board 319 included in a controller may be installed in the rear of the main frame 130. A bracket 170 may be coupled with a lower part or a lower side of the main frame 130. The bracket 170 may be coupled with a front surface of the lower part of the main frame 130. The bracket 170 may be coupled with a lower end of the main frame 130.

An optical layer 123 may be positioned in front of the main frame 130. An optical sheet 125 may be positioned in front of the optical layer 123. The optical sheet 125 may be positioned on a front surface of the optical layer 123. A light assembly 124 may be positioned in the rear of the optical layer 123. The light assembly 124 may be positioned adjacent to a back surface of the optical layer 123. The light assembly 124 may provide light for the back surface of the optical layer 123. The optical layer 123 and/or the optical sheet 125 may make light provided by the light assembly 124 travel toward the display panel 110. The light assembly 124 may be mounted on a substrate 122. A reflective sheet 126 may be positioned between the substrate 122 and the optical layer 123. The reflective sheet 126 may be positioned around the light assembly 124. The light assembly 124 may be inserted into the reflective sheet 126. The reflective sheet 126 may make light travelling around the light assembly 124 travel toward the front of the light assembly 124.

The display panel 110 may be positioned in front. One side of the display panel 110 may be exposed to the outside. An upper side, a lower side, and left and right sides of the display panel 110 may be exposed to the outside. The display panel 110 may include the front substrate 111 and the back substrate 112. An area of the front substrate 111 may be greater than an area of the back substrate 112. The back substrate 112 may cover a back surface of the front substrate 111 and expose a portion of the front substrate 111 to the outside. An electrode 115 may be formed on the exposed portion of the front substrate 111. The electrode 115 may be electrically connected to an electrode line EL formed on the front substrate 111.

A member layer 117 may be electrically connected to the electrode 115. The member layer 117 may contact the electrode 115. The member layer 117 may extend from the electrode 115 toward the rear of the main frame 130. The member layer 117 may be positioned adjacent to a lower surface of the bracket 170. The member layer 117 may surround a portion of the lower surface of the bracket 170 and extend toward the rear of the main frame 130. The member layer 117 may cover a portion of the lower surface of the bracket 170. The member layer 117 may be electrically connected to the controller, for example, the timing controller board 319.

A bottom frame 180 may form a lower part of the display device 100. The bottom frame 180 may be positioned under the bracket 170. The bottom frame 180 may be positioned opposite a lower surface of the bracket 170. The bottom frame 180 may be positioned under the main frame 130. The bottom frame 180 may cover the member layer 117. The bottom frame 180 may include a horizontal portion 180P and a vertical portion 180V. The horizontal portion 180P may be positioned at a lower end of the main frame 130. The horizontal portion 180P may be positioned adjacent to the lower surface of the bracket 170. The horizontal portion 180P may cover the member layer 117. The horizontal portion 180P may protect the display device 100 from an impact which may be generated in the lower part of the display device 100. The vertical portion 180V may be positioned in the rear of the main frame 130. More specifically, the vertical portion 180V may be positioned in the rear of the main frame 130 by extending from the horizontal portion 180P and bending. The vertical portion 180V may cover the member layer 117 positioned in the rear of the main frame 130.

A back cover 150 may form a portion of the back surface of the display device 100. The back cover 150 may be connected to the bottom frame 180. One side of the back cover 150 may be coupled with the main frame 130, and the other side may be coupled with the bottom frame 180.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a main frame disposed at a rear of the display panel;
a side frame extending along sides of the display panel and comprising:
  a first part extending along a first short side of the display panel;
  a second part adjacent to the first part and extending along a first long side of the display panel; and
  a third part adjacent to the second part and extending along a second short side of the display panel opposite the first short side;
wherein each of the first part, second part, and third part comprises:
  a flat portion configured to support a rear surface of the display panel and coupled to the rear surface via a supporting layer;
  a securing portion configured to be coupled with a corresponding side of the main frame; and
  an exterior portion extending laterally beyond a corresponding side of the display panel and comprising a surface visible from a front of the display device that is angled with respect to the flat portion,
wherein the side frame further comprises cut-out portions of the flat portion between the first part and the second part and of the flat portion between the second part and the third part.

2. The display device of claim 1, wherein the securing portion is configured to engage with the corresponding side of the main frame to secure the main frame.

3. The display device of claim 2, wherein the securing portion comprises a coupling protrusion such that a securing space is defined between the coupling protrusion and the side frame, and
wherein the securing space is configured to accommodate an edge of the main frame to secure the main frame.

4. The display device of claim 3, wherein the securing space is configured as a sliding groove and the main frame is configured to be slidably engaged with the sliding groove.

5. The display device of claim 1, wherein the display panel comprises at least one substrate and a first layer coupled to the front of the at least one substrate and a second layer coupled to a rear of the at least one substrate, wherein a size of the at least one substrate is larger than a size of the second layer such that an extending portion of a rear of the at least one substrate extends beyond an edge of the second layer, and wherein the extending portion of the rear of the at least one substrate is coupled to the supporting layer.

6. The display device of claim 1, wherein the display panel further comprises a sealing member configured to cover a lateral edge of the at least one substrate.

7. The display device of claim 1, wherein the side frame comprises a plurality of grooves disposed along an inner portion of the side frame and configured to secure an optical sheet between the display panel and a light guide panel.

8. The display device of claim 1, wherein a first reinforcement member is disposed at the flat portion between the first part and the second part of the side frame and a second reinforcement member is disposed at the flat portion between the second part and the third part of the side frame.

9. The display device of claim 8, wherein at least one of the first reinforcement member or the second reinforcement member includes a gap formed near a corner portion thereof to provide flexibility to the at least one of the first reinforcement member or the second reinforcement member.

10. The display device of claim 1, further comprising a bottom frame positioned along a second long side of the display panel opposite the first long side of the display panel and configured to be coupled with the first part and the third part of the side frame.

11. The display device of claim 1, wherein the side frame comprises metal materials.

12. The display device of claim 1, wherein the cut-out portions are positioned at an inner portion of corners of the side frame.

13. The display device of claim 1, wherein the main frame is secured to the securing portion via an adhesive member.

14. The display device of claim 1, further comprising a backlight unit comprising an optical layer, an optical sheet, and a light assembly, wherein lateral edges of the backlight unit are covered by the side frame.

15. The display device of claim 14, wherein the display panel is positioned at a forward position with respect to the side frame such that edges of the display panel laterally extend past an inner portion of the side frame.

* * * * *